United States Patent
Wright et al.

(10) Patent No.: US 8,869,187 B2
(45) Date of Patent: Oct. 21, 2014

(54) METHODS AND APPARATUS TO DETERMINE AUDIENCE VIEWING OF RECORDED PROGRAMS

(75) Inventors: David Howell Wright, Safety Harbor, FL (US); Joseph Milavsky, Dunedin, FL (US); Morris Lee, Palm Harbor, FL (US); William A. Feininger, Palm Harbor, FL (US); Charles Conklin, New Port Richey, FL (US); Vasiliki Koutsopanagos, Palm Harbor, FL (US); Arun Ramaswamy, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 49 days.

(21) Appl. No.: 13/240,805

(22) Filed: Sep. 22, 2011

(65) Prior Publication Data
US 2012/0011533 A1 Jan. 12, 2012

Related U.S. Application Data

(63) Continuation of application No. 11/465,260, filed on Aug. 17, 2006, now Pat. No. 8,065,697, which is a
(Continued)

(51) Int. Cl.
*H04H 60/40* (2008.01)
*H04N 21/432* (2011.01)
(Continued)

(52) U.S. Cl.
CPC .......... *H04H 60/40* (2013.01); *H04N 21/4325* (2013.01); *H04H 60/56* (2013.01); *H04H 60/44* (2013.01); *H04N 21/44218* (2013.01); *H04H 21/84* (2013.01); *H04H 60/58* (2013.01); *H04H 60/37* (2013.01); *H04N 21/4756* (2013.01); *H04N 21/44222* (2013.01); *H04H 60/43* (2013.01); *H04H 60/27* (2013.01); *H04H 2201/90* (2013.01); *H04N 7/17318* (2013.01); *H04N 21/42203* (2013.01); *H04H 60/59* (2013.01); *H04N 21/42202* (2013.01)
USPC ............ 725/21; 725/14; 725/115; 348/E7.07; 348/E7.063

(58) Field of Classification Search
CPC .................................................. H04N 21/6582
USPC .......... 369/32.1, 32; 386/330; 725/19, 21, 35, 725/138, 115
See application file for complete search history.

(56) References Cited

U.S. PATENT DOCUMENTS

| 4,697,209 A | 9/1987 | Kiewit et al. |
|---|---|---|
| 4,750,213 A | 6/1988 | Novak |

(Continued)

FOREIGN PATENT DOCUMENTS

| CA | 2323539 | 10/1999 |
|---|---|---|
| EP | 1043853 A2 | 10/2000 |

(Continued)

OTHER PUBLICATIONS

USPTO, "Office Action," issued in connection with U.S. Appl. No. 11/766,405, dated Aug. 31, 2012, 28 pages.

(Continued)

*Primary Examiner* — Jeffereey Harold
*Assistant Examiner* — Sihar Karwan
(74) *Attorney, Agent, or Firm* — Hanley, Flight & Zimmerman, LLC

(57) ABSTRACT

Methods and apparatus to determine audience viewing of recorded programs are disclosed. An example method disclosed herein comprises processing first bus information obtained by monitoring a bus of a time shifting device to determine a record time corresponding to when the time-shifting device stored data associated with first media content being recorded for later presentation, processing second bus information obtained by monitoring the bus of the time shifting device to determine a playback time corresponding to when the time-shifting device later retrieved the data to present the recorded first media content, and estimating a possible distribution time corresponding to when the first media content was initially distributed to the time-shifting device based on a difference between the playback time and the record time.

17 Claims, 13 Drawing Sheets

Related U.S. Application Data continuation of application No. PCT/US2005/005064, filed on Feb. 17, 2005.

(60) Provisional application No. 60/545,309, filed on Feb. 17, 2004.

(51) Int. Cl.
```
H04H 60/56      (2008.01)
H04H 60/44      (2008.01)
H04N 21/442     (2011.01)
H04H 60/58      (2008.01)
H04H 60/37      (2008.01)
H04N 21/475     (2011.01)
H04H 60/43      (2008.01)
H04H 60/27      (2008.01)
H04N 7/173      (2011.01)
H04N 21/422     (2011.01)
H04H 60/59      (2008.01)
```

(56) References Cited

U.S. PATENT DOCUMENTS

| | | | |
|---|---|---|---|
| 4,752,834 A | 6/1988 | Koombes | |
| 4,782,401 A | 11/1988 | Faerber et al. | |
| 4,792,864 A | 12/1988 | Watanabe et al. | |
| 4,888,638 A | 12/1989 | Bohn | |
| 4,931,865 A | 6/1990 | Scarampi | |
| 4,943,963 A | 7/1990 | Waechter et al. | |
| 5,270,829 A | 12/1993 | Yang | |
| 5,333,091 A | 7/1994 | Iggulden et al. | |
| 5,481,294 A | 1/1996 | Thomas et al. | |
| 5,481,296 A | 1/1996 | Cragun et al. | |
| 5,512,933 A | 4/1996 | Wheatley et al. | |
| 5,521,631 A | 5/1996 | Budow et al. | |
| 5,535,209 A | 7/1996 | Glaser et al. | |
| 5,574,963 A | 11/1996 | Weinblatt et al. | |
| 5,661,526 A | 8/1997 | Hamamoto et al. | |
| 5,699,370 A | 12/1997 | Kaniwa et al. | |
| 5,703,655 A | 12/1997 | Corey et al. | |
| 5,737,026 A | 4/1998 | Lu et al. | |
| 5,819,156 A | 10/1998 | Belmont | |
| 5,999,689 A | 12/1999 | Iggulden | |
| 6,002,443 A | 12/1999 | Iggulden | |
| 6,184,918 B1 | 2/2001 | Goldschmidt Iki et al. | |
| 6,233,389 B1 | 5/2001 | Barton et al. | |
| 6,343,179 B1 | 1/2002 | Suito et al. | |
| 6,404,977 B1 | 6/2002 | Iggulden | |
| 6,513,161 B2 | 1/2003 | Wheeler et al. | |
| 6,675,383 B1 | 1/2004 | Wheeler et al. | |
| 6,850,691 B1 | 2/2005 | Stam et al. | |
| 7,057,986 B2 | 6/2006 | Fukuchi | |
| 7,076,153 B2 | 7/2006 | Ando et al. | |
| 7,260,311 B2 | 8/2007 | Okujima et al. | |
| 7,712,114 B2 | 5/2010 | Ramaswamy | |
| 7,882,514 B2 | 2/2011 | Nielsen et al. | |
| 8,023,798 B2 | 9/2011 | Hagiwara et al. | |
| 8,204,353 B2 | 6/2012 | Conklin | |
| 2001/0014058 A1* | 8/2001 | Ando et al. | 369/32 |
| 2002/0010919 A1 | 1/2002 | Lu et al. | |
| 2002/0034374 A1 | 3/2002 | Barton | |
| 2002/0056087 A1 | 5/2002 | Berezowski et al. | |
| 2002/0059577 A1 | 5/2002 | Lu et al. | |
| 2002/0090198 A1 | 7/2002 | Rosenberg et al. | |
| 2002/0120925 A1 | 8/2002 | Logan | |
| 2003/0029892 A1 | 2/2003 | Kawano et al. | |
| 2003/0154128 A1 | 8/2003 | Liga et al. | |
| 2003/0229892 A1 | 12/2003 | Sardera | |
| 2004/0250281 A1 | 12/2004 | Feininger et al. | |
| 2005/0125820 A1 | 6/2005 | Nelson et al. | |
| 2005/0138658 A1 | 6/2005 | Bryan | |
| 2005/0177858 A1 | 8/2005 | Ueda | |
| 2006/0195857 A1 | 8/2006 | Wheeler et al. | |
| 2006/0212895 A1 | 9/2006 | Johnson | |
| 2006/0232575 A1 | 10/2006 | Nielsen | |
| 2007/0050832 A1 | 3/2007 | Wright et al. | |
| 2007/0192782 A1 | 8/2007 | Ramaswamy | |
| 2007/0248310 A1 | 10/2007 | Feininger et al. | |
| 2008/0148307 A1 | 6/2008 | Nielsen et al. | |
| 2010/0172407 A1 | 7/2010 | Ramaswamy | |
| 2010/0274372 A1 | 10/2010 | Nielsen et al. | |

FOREIGN PATENT DOCUMENTS

| | | |
|---|---|---|
| EP | 1254561 A2 | 6/2001 |
| EP | 1183689 A1 | 3/2002 |
| WO | 0072484 A1 | 11/2000 |
| WO | 0147238 | 6/2001 |
| WO | 0249246 A1 | 6/2002 |
| WO | 2004051997 | 6/2004 |
| WO | 2006014495 | 2/2006 |
| WO | 0147279 | 6/2007 |

OTHER PUBLICATIONS

USPTO, "Office Action," issued in connection with U.S. Appl. No. 11/766,405, dated Dec. 8, 2011, 28 pages.

USPTO, "Office Action," issued in connection with U.S. Appl. No. 11/766,405, dated May 23, 2013, 16 pages.

Notice of Allowance, issued by the Canadian Intellectual Property Office in connection with Canadian Patent Application No. 2,556,548, on Nov. 15, 2012, 1 page.

European Search Report, issued by the European Patent Office in connection with European Patent Application No. 05723212.6, on Sep. 19, 2012, 4 pages.

Preliminary Examination Report, issued by the Taiwanese Intellectual Property Office (TIPO) in connection with Taiwanese Patent Application No. 94104620, on Jan. 16, 2012, 14 pages.

IP Australia, "Second Examiner's Report," issued in connection with Australian Application No. 2005214965, mailed on Jan. 6, 2011, (4 pages).

IP Australia, "First Examiner's Report," issued in connection with Australian Application No. 2005214965, mailed on Nov. 25, 2009, (2 pages).

Canadian Intellectual Property Office, "Office Action," issued in connection with Canadian Patent Application No. 2,556,548, mailed on Jul. 18, 2011, (7 pages).

United States Patent and Trademark Office, "Notice of Allowance," issued in connection with U.S. Appl. No. 10/483,825, mailed on Mar. 9, 2007, (9 pages).

United States Patent and Trademark Office, "Office Action," issued in connection with U.S. Appl. No. 10/483,825, mailed on Jan. 25, 2007, (8 pages).

United States Patent and Trademark Office, "Notice of Allowance," issued in connection with U.S. Appl. No. 11/465,260, mailed on Jun. 23, 2011, (11 pages).

United States Patent and Trademark Office, "Final Office Action," issued in connection with U.S. Appl. No. 11/465,260, mailed on Sep. 30, 2010, (27 pages).

United States Patent and Trademark Office, "Office Action," issued in connection with U.S. Appl. No. 11/465,260, mailed on Feb. 25, 2010, (29 pages).

United States Patent and Trademark Office, "Office Action," issued in connection with U.S. Appl. No. 11/465,260, mailed on Jul. 29, 2009, (24 pages).

United States Patent and Trademark Office, "Office Action," issued in connection with U.S. Appl. No. 11/465,260, mailed on Sep. 18, 2008, (28 pages).

United States Patent and Trademark Office, "Notice of Allowance," issued in connection with U.S. Appl. No. 11/672,706, mailed on Dec. 31, 2009, (6 pages).

United States Patent and Trademark Office, "Office Action," issued in connection with U.S. Appl. No. 11/672,706, mailed on Jul. 23, 2009, (8 pages).

United States Patent and Trademark Office, "Notice of Allowance," issued in connection with U.S. Appl. No. 12/725,018 mailed on Jun. 27, 2011, (8 pages).

(56) References Cited

OTHER PUBLICATIONS

United States Patent and Trademark Office, "Notice of Allowance," issued in connection with U.S. Appl. No. 11/576,328, mailed on Apr. 7, 2010, (8 pages).

United States Patent and Trademark Office, "Office Action," issued in connection with U.S. Appl. No. 11/576,328, mailed on Aug. 7, 2009, (11 pages).

United States Patent and Trademark Office, "Office Action," issued in connection with U.S. Appl. No. 11/576,328, mailed on Feb. 5, 2009, (14 pages).

Patent Cooperation Treaty, "International Preliminary Examination Report," issued in connection with PCT Application No. PCT/US2003/12001, mailed on Dec. 15, 2003, (3 pages).

Patent Cooperation Treaty, "International Search Report," issued in connection with PCT Application No. PCT/US2003/12001, mailed on Jun. 27, 2003, (3 pages).

Patent Cooperation Treaty, "International Search Report and Written Opinion," issued in connection with PCT Application No. PCT/US2005/005064, mailed on Sep. 25, 2008, (8 pages).

IP Australia, "First Examiner's Report," issued in connection with Australian Application No. 2011213735 mailed on May 22, 2012, (2 pages).

IP Australia, "Second Examiner's Report," issued in connection with Australian Application No. 2011213735 mailed on May 31, 2013, (2 pages).

European Patent Office, "Examination Report," issued in connection with corresponding European Application No. 05723212.6, dated Jan. 2, 2014, (7 pages).

United States Patent and Trademark Office, "Office Action," issued in connection with U.S. Appl. No. 11/766,405, mailed on Jan. 6, 2014, (12 pages).

United States Patent and Trademark Office, "Final Office Action", issued in connection with U.S. Appl. No. 11/766,405, dated Jul. 31, 2014 (5 pages).

* cited by examiner

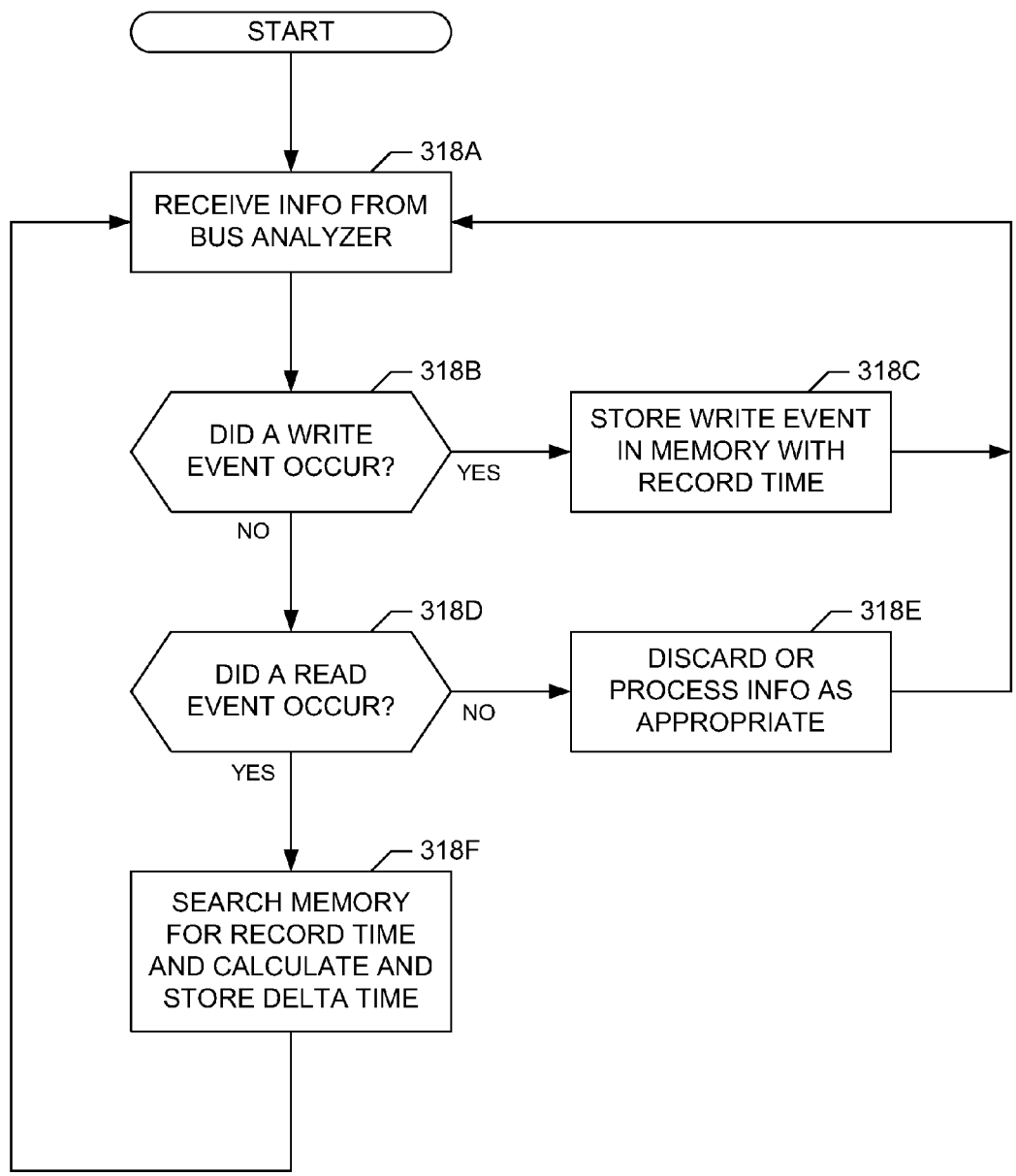
FIG. 3A1

METHODS AND APPARATUS TO DETERMINE AUDIENCE VIEWING OF RECORDED PROGRAMS

RELATED APPLICATION

This patent is a continuation of U.S. patent application Ser. No. 11/465,260, entitled "Methods and Apparatus to Determine Audience Viewing of Recorded Programs," which filed on Aug. 17, 2006, and which is a continuation of International Application Serial Number PCT/US05/005064, entitled "Methods and Apparatus to Determine Audience Viewing of Recorded Programs," which was filed on Feb. 17, 2005, and which claims priority from U.S. Provisional Application Ser. No. 60/545,309, entitled "Methods and Apparatus to Determine Audience Viewing of Recorded Programs" and filed on Feb. 17, 2004. U.S. patent application Ser. No. 11/465,260, International Application Serial Number PCT/US05/05064 and U.S. Provisional Application Ser. No. 60/545,309 are hereby incorporated by reference in their respective entireties.

FIELD OF THE DISCLOSURE

This disclosure relates generally to audience measurement and, more particularly, to methods and apparatus to determine audience viewing of recorded programs.

BACKGROUND

Television ratings and metering information is typically generated by collecting viewing records and/or other viewing information from a group of statistically selected households. Each of the statistically selected households typically has a data logging and processing unit commonly referred to as a "home unit." In households having multiple viewing sites (e.g., multiple television systems), the data logging and processing functionality may be distributed among a single home unit and multiple "site units," one site unit for each viewing site. The home unit (or the combination of the home unit and the site unit) is often in communication with a variety of attachments that provide inputs to the home unit or receive outputs from the home unit. For example, a source identification unit such as a frequency detector attachment may be in communication with a television to sense a local oscillator frequency of the television tuner. In this manner, the frequency detector attachment may be used to determine the channel to which the television is currently tuned based on a detected frequency. Additional source identification devices, such as on-screen readers and light-emitting-diode (LED) display readers, may be provided, for example, to determine if the television is operating (i.e., is turned ON) and/or the channel to which the television is tuned. A people counter may also be located in the viewing space of the television and in communication with the home unit, thereby enabling the home unit to detect the identities and/or number of the persons currently viewing programs displayed on the television.

The home unit usually processes the inputs (e.g., channel tuning information, viewer identities, etc.) from the attachments to produce viewing records. Viewing records may be generated on a periodic basis (i.e., at fixed time intervals) or may be generated in response to a change in an input, such as a change in the identities of the persons viewing the television, a change in the channel tuning information (i.e., a channel change), etc. Each viewing record typically contains channel information, such as a channel number and/or station identification (ID), and a time (e.g., a date and time-of-day) at which the channel was displayed. In cases in which the program content being displayed is associated with a local audio/video content delivery device, such as a digital video disk (DVD) player, a digital video recorder (DVR), a video cassette recorder (VCR), etc., the viewing records may include content identification (i.e., program identification) information as well as information relating to the time and manner in which the associated content was displayed. Viewing records may also contain additional information, such as the number of viewers present at the viewing time.

The home unit typically collects a quantity of viewing records and periodically transmits the collected viewing records (e.g., daily) to a central office or data processing facility for further processing or analysis. The central data processing facility receives viewing records from home units located in some or all of the statistically selected households and analyzes the viewing records to ascertain the viewing behaviors of households in a geographic area or market of interest, a particular household and/or a particular group of households selected from all participating households. Additionally, the central data processing facility may generate metering statistics and other parameters indicative of viewing behavior associated with some or all of the participating households. This data may be extrapolated to reflect the viewing behaviors of markets and/or regions modeled by the statistically selected households.

To generate viewing behavior information from viewing records, the central office or data processing facility may compare reference data, such as a list of programs (e.g., a schedule of television programming or a television guide), to the viewing records. In this manner, the central office can infer which program was displayed by cross-referencing the time and channel information in a viewing record to the program associated with that same time and channel in the program schedule. Such a cross-referencing process can be carried out for each of the viewing records received by the central office, thereby enabling the central office to reconstruct which programs were displayed by the selected households and the times at which the programs were displayed. Of course, the aforementioned cross-referencing process is unnecessary in systems in which the identity of the program is obtained by the home unit and contained in the viewing record.

The rapid development and deployment of a wide variety of audio/video content delivery and distribution platforms has dramatically complicated the home unit task of providing viewing records or information to the central data collection facility. For instance, while the above-mentioned frequency detector device can be used to detect channel information at a site where network television broadcasts are being displayed (because, under normal operation conditions, the local oscillator frequency corresponds to a known network channel), such a device typically cannot be used with digital broadcast systems. In particular, digital broadcast systems (e.g., satellite-based digital television systems, digital cable systems, etc.) typically include a digital receiver or set-top box at each subscriber site. The digital receiver or set-top box demodulates a multi-program data stream, parses the multi-program data stream into individual audio and/or video data packets, and selectively processes those data packets to generate an audio/video signal for a desired program. The audio and/or video output signals generated by the set-top box can be directly coupled to an audio/video input of an output device (e.g., a television, a video monitor, etc.) As a result, the local oscillator frequency of the output device tuner, if any, does not necessarily have any meaningful relationship to the channel or program currently being displayed.

To allow generation of meaningful viewing records in cases wherein, for example, the network channel is not readily identifiable or may not uniquely correspond to a displayed program, metering techniques based on the use of ancillary codes and/or content signatures may be employed. Metering techniques that rely on ancillary codes often encode and embed identifying information (e.g., a broadcast/network channel number, a program identification code, a broadcast time stamp, a source identifier to identify a network and/or station providing and/or broadcasting the content, etc.) in the broadcast signal such that the code is not noticed by the viewer. For example, a well-known technique used in television broadcasting involves embedding the ancillary codes in the non-viewable vertical blanking interval of the video signal. Another example involves embedding the ancillary codes in non-audible portions of the audio signal accompanying the broadcast program. This latter technique is especially advantageous because the ancillary code may be reproduced by, for example, the television speaker and non-intrusively monitored by an external sensor, such as a microphone.

In general, signature-based program identification techniques use one or more characteristics of the currently displayed (but not yet identified) audio/video content to generate a substantially unique proxy or signature (e.g., a series of digital values, a waveform, etc.) for that content. The signature information for the content being displayed may be compared to a set of reference signatures corresponding to a known set of programs. When a substantial match is found, the currently displayed program content can be identified with a relatively high probability.

While the known apparatus and techniques described above are well suited for generating viewing records associated with live viewing of television programming, these techniques are not directly applicable to the generation of viewing records associated with time-shifted viewing of program content (i.e., viewing a previously recorded program at a time later than the original broadcast time or, in other words, viewing a time-shifted broadcast program). In particular, local sources, such as DVD players, personal video recorders (PVRs), DVRs, VCRs and the like, enable the recording and playback of program content at various times other than the original broadcast time and in different manners across the statistically selected households. As a result, viewing records containing only viewing time information (and not original broadcast time information) cannot be compared to reference program guide information at the central office to infer which programs are associated with the viewing records. Further, the tuning information available from, for example, a frequency detector attachment in communication with a television that is being used to display a previously recorded program may not provide useful network channel information. More specifically, the recorded program is typically supplied by a video recorder (e.g., a VCR) or the like that sends unmodulated low-level video and audio signals to the video and audio inputs of the television that bypass the tuner circuitry of the television. The use of DVRs and PVRs, such as the TiVo™ system, further complicates the collection of viewing behavior information because viewers in households with these types of recording devices can rapidly alternate between live viewing of a program, a somewhat delayed viewing of a program, fast-forwarding and rewinding a program, pausing a program, and recording a program for later viewing while watching a live broadcast of another program.

BRIEF DESCRIPTION OF THE DRAWINGS

FIGS. 3A, 3A1 and 3B-3E are flowcharts representative of example machine readable instructions which may be executed on a machine to implement at least portions of the home unit and/or time-shifting device monitor of FIG. 1.

DETAILED DESCRIPTION

Figure 1:
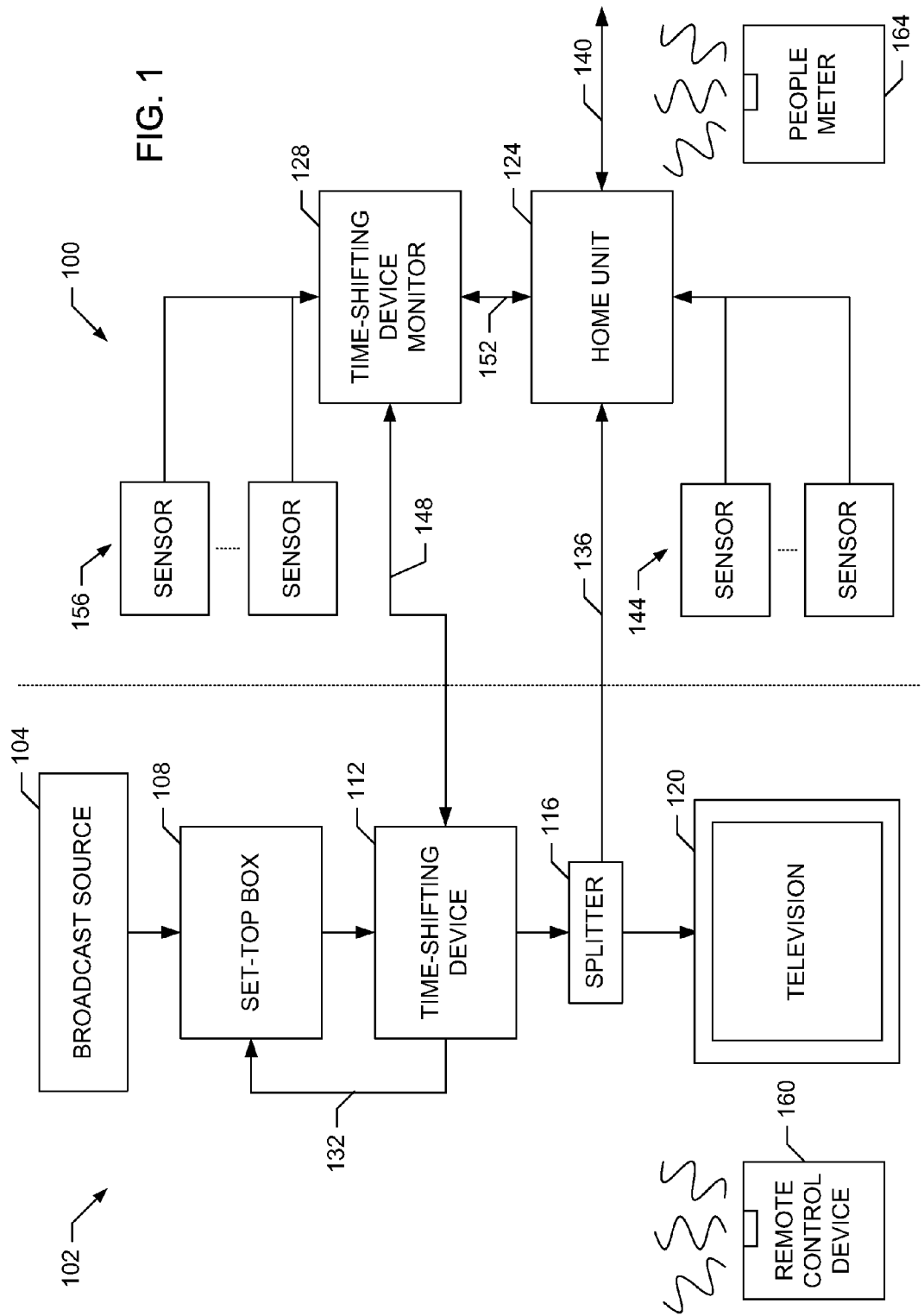
FIG. 1 is a block diagram of an example local metering system coupled to an example home entertainment system.

A block diagram of an example local metering system 100 capable of providing viewing and metering information for time-shifted viewing of previously recorded program content via an example home entertainment system 102 is illustrated in FIG. 1. The example home entertainment system 102 includes a broadcast source 104, a set-top box 108, a time-shifting device 112, a signal splitter 116 and a television 120. The example local metering system 100 includes a home unit 124 and a time-shifting device monitor 128. The components of the home entertainment system 102 and the local metering system 100 may be connected in any well-known manner including that shown in FIG. 1. For example, in a statistically selected household having one or more home entertainment systems 102, the home unit 124 may be implemented as a single home unit and one or more site units. In such a configuration, the single home unit performs the functions of storing data and forwarding the stored data to a central facility (such as the central facility 211 of FIG. 2 discussed below) for subsequent processing. Each site unit is coupled to a corresponding home entertainment system 102 and performs the functions of providing one or more interfaces to facilitate the collection of viewing/metering data, processing such data (possibly in real-time) and sending the processed data to the single home unit for storing and reporting to the central facility.

The broadcast source 104 may be any broadcast media source, such as a cable television service provider, a satellite television service provider, a radio frequency (RF) television service provider, an internet streaming video/audio provider, etc. The broadcast source 104 may provide analog and/or digital television signals to the home entertainment system 102, for example, over a coaxial cable or via a wireless connection.

The set-top box 108 may be any set-top box, such as a cable television converter, a direct broadcast satellite (DBS) decoder, a video cassette recorder (VCR), etc. The set-top box 108 receives a plurality of broadcast channels from the broadcast source 104. Typically, the set-top box 108 selects one of the plurality of broadcast channels based on a user input, and outputs one or more signals received via the selected broadcast channel. In the case of an analog signal, the set-top box 108 tunes to a particular channel to obtain programming delivered on that channel. For a digital signal, the set-top box 108 decodes certain packets of data to obtain the programming delivered on a selected channel. For some home entertainment systems 102, for example, those in which the broadcast source 104 is a standard RF analog television service provider or a basic analog cable television service provider, the set-top box 108 may not be present as its function is performed by a tuner in the television 120 and/or the time-shifting device 112.

The output of the set-top box 108 is coupled to the input of a time-shifting device 112. Alternatively, the set-top box 108 and the time-shifting device 112 may be integrated into a single unit. (For configurations in which the set-top box 108 is not present, the broadcast source 104 and/or an audio/video signal output of the television 120 may be coupled to the input of the time-shifting device 112). The time-shifting device 112 may be, for example, a digital video recorder (DVR) or a personal video recorder (PVR), both of which are well-known devices. A PVR is a DVR that has been configured to be automatically adaptive to or otherwise automatically responsive to the viewing preferences of a particular user or group of users within a particular household. For example, many DVRs provide a phone line connection that enables the DVR to communicate with a central service facility that receives viewer preference information from the DVR and which sends configuration information to the DVR based on those viewer preferences. The configuration information is used by the DVR to automatically configure the DVR to record video programs consistent with the preferences of the viewer or viewers associated with that DVR. TiVo™ is one well-known service that provides PVR functionality to an otherwise standard or conventional DVR. Although the examples described herein correspond to the time-shifting device 112 being a DVR or PVR that records audio/video programming, the time-shifting device 112 could be any other type of recording device that records any desired type of audio information, video information and/or image information. For example, the time-shifting device 112 could be a VCR or a personal computer recording any type of information including, for example, web pages, broadcast audio data and/or broadcast video data.

The time-shifting device 112 may also be coupled to the set-top box 108 (or television 120 if, for example, the set-top box 108 is not present) via a return connection 132. The return connection 132 allows the time-shifting device 112 to direct the set-top box 108 (or television 120), for example, to select a desired broadcast channel for viewing and/or recording. The time-shifting device 112 may also use the return connection 132 to control other features of the set-top box 108 (or television 120), such as volume control, programming guide display, etc.

The example time-shifting device 112 may be configured to record a program being broadcast on a channel selected by the set-top box 108 (or television 120). Alternatively or additionally, the time-shifting device 112 may be configured to cause the television 120 to display a currently broadcast program or a previously recorded program. Many time-shifting devices 112 are able to cause the television 120 to simultaneously display a currently broadcast program and a previously recorded program. Thus, the time-shifting device 112 may provide a viewer with the ability, for example, to pause, rewind and even fast-forward a "live" broadcast program (although in actuality the live broadcast program is delayed within the time-shifting device 112 to the extent with which the program is paused or rewound) and/or display two broadcast programs simultaneously (e.g., using a picture-in-picture or split-screen format). The time-shifting device 112 may also be used to record a broadcast program for viewing at a later time.

The output from the time-shifting device 112 is fed to a signal splitter 116, such as a single analog y-splitter in the case of an RF coaxial connection between the time-shifting device 112 and the television 120 or an audio/video splitter in the case of a direct audio/video connection between the time-shifting device 112 and the television 120. In the example home entertainment system 102, the signal splitter produces two signals indicative of the output from the time-shifting device 112. Of course, a person of ordinary skill in the art will readily appreciate that any number of signals may be produced by the signal splitter 116. In the illustrated example, one of the two signals from the signal splitter 116 is fed to the television 120 and the other signal is delivered to the home unit 124. The television 120 may be any type of television or television display device. For example, the television 120 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The second of the two signals from the signal splitter 116 (i.e., the signal carried by connection 136 in FIG. 1) is coupled to an input of the home unit 124. The home unit 124 is a data logging and processing unit that may be used to generate viewing records and other viewing information useful for determining ratings and other metering information based on a group of statistically selected households. The home unit 124 typically collects a set of viewing records and transmits the collected viewing records over a connection 140 to a central office or data processing facility (not shown) for further processing or analysis. The connection 140 may be a telephone line, a return cable television connection, an RF or satellite connection, an internet connection or the like.

The home unit 124 may be configured to determine identifying information based on the signal corresponding to the program content being output by the time-shifting device 112. For example, the home unit 124 may be configured to decode an embedded ancillary code in the signal received via connection 136 that corresponds to the program currently being output by the time-shifting device 112 for display on the television 120. The ancillary code may have been embedded by the broadcast station from which the program was broadcast or may have been embedded by the time-shifting device 112 or may have been embedded at any other point in the distribution chain.

Alternatively or additionally, the home unit 124 may be configured to generate a program signature based on the signal received via connection 136 that corresponds to the program currently being output by the time-shifting device 112 for display on the television 120. The home unit may then add this program identifying information to the viewing records corresponding to the currently displayed program.

To facilitate the determination of program identifying information and the generation of viewing records for the currently displayed program content, the home unit 124 may also be provided with one or more sensors 144. For example, one of the sensors 144 may be a microphone placed in the proximity of the television 120 to receive audio signals corresponding to the program being displayed. The home unit 124 may then process the audio signals received from the microphone 144 to decode any embedded ancillary code(s) and/or generate one or more audio signatures corresponding to a program being displayed. Another of the sensors 144 may be an on-screen display detector for capturing images displayed on the television 120 and processing regions of interest in the displayed image. The regions of interest may correspond, for example, to a broadcast channel associated with the currently displayed program, a broadcast time associated with the currently displayed program, a viewing time associated with the currently displayed program, etc. An example on-screen display detector is disclosed by Nelson, et al. in U.S. Provisional Patent Application Ser. No. 60/523,444 which is hereby incorporated by reference. Yet another of the sensors 144 could be a frequency detector to determine, for example, the channel to which the television 120 is tuned. One having ordinary skill in the art will recognize that there are a variety of sensors 144 that may be coupled with the home unit 124 to facilitate generation of viewing records containing sufficient information for the central office to determine a set of desired ratings and/or metering results.

To determine information specific to the time-shifting device 112 and the program content output thereby, the example local metering system 100 includes a time-shifting device monitor 128. The time-shifting device monitor 128 is coupled to the time-shifting device 112 via a device interface 148 and is also coupled to the home unit 124 via a home unit interface 152. The device interface 148 may be, for example, a digital bus interface that allows the time-shifting device monitor 128 to determine the state of and/or examine/modify the operation of the time-shifting device 112. Alternatively or additionally, the time-shifting device monitor 128 may receive program information packets (or the contents thereof) over the device interface 148 that correspond to the program currently being output and/or recorded by the time-shifting device 112. The program information packets (or the contents thereof) may contain information regarding the program currently being output and/or recorded by the time-shifting device 112, including, for example, the original broadcast time, the original broadcast channel number, the program record (write data to memory/storage) time, the program playback (read data from memory/storage) time, etc.

To create the program information packets, an example time-shifting device 112 may include a software meter that determines information regarding the program being recorded and/or displayed, such as the original broadcast time, channel number, record/playback time, etc., and stores such information in an information packet or packets along with the data packets corresponding to the broadcast program being recorded/displayed. Alternatively or additionally, the example time-shifting device 112 may be configured to allow the time-shifting device monitor 128 to examine the internal state/operation of the time-shifting device 112 and/or process the actual data packets corresponding to the broadcast program being recorded/displayed. The time-shifting device monitor 128 may then use the resulting information to create an information packet or packets corresponding to the recorded/displayed program and including, for example, the original broadcast time, channel number, program name, record/playback time, etc.

The home unit interface 152 may be, for example, a bus interface that allows the time-shifting device monitor 128 to provide, for example, program information packets (or the contents thereof) to the home unit 124 for inclusion in the viewing record or records being created for the program content currently being displayed on the television 120. Alternatively or additionally, the home unit 124 may use the home unit interface 152 to direct the time-shifting device monitor 128 to query the time-shifting device 112 to provide identifying information corresponding to the program currently being displayed on the television 120.

The time-shifting device monitor 128 may also be coupled to one or more sensors 156. For example, one of the sensors 156 may be a light detector to determine whether a record light on the time-shifting device 112 is lit. The record light detector 156 could be used by the time-shifting device monitor 128 to generate a set of possible original broadcast time intervals corresponding to a program being output by the time-shifting device 112 on the television 120. The use of the set of possible original broadcast time intervals is discussed in greater detail below. One having ordinary skill in the art will recognize that there are a variety of sensors 156 that may be coupled with the time-shifting device monitor 128 to determine additional information regarding the operation of the time-shifting device 112.

In an example local metering system 100, the home unit 124 may be configured to generate a viewing record or records based on the state of the television 120 as measured by a sensor or sensors 144. In this case, the home unit 124 may include a program information packet (or contents thereof) provided by the time-shifting device monitor 128 in the viewing record or records being generated. In another example local metering system 100, the time-shifting device monitor 128 may be configured to trigger the home unit 124 to generate a viewing record or records based on the state of the time-shifting device 112 as measured by a sensor or sensors 156. One having ordinary skill in the art will recognize that various combinations of triggers may be used to cause the generation of the viewing records corresponding to the program currently being displayed on the television 120.

The example home entertainment system 102 also includes a remote control device 160 to transmit control information that may be received by any or all of the set-top box 108, the time-shifting device 112, the television 120, the home unit 124 and the time-shifting device monitor 128. One having ordinary skill in the art will recognize that the remote control device 160 may transmit this information using a variety of techniques, including, but not limited to, infrared (IR) transmission, radio frequency transmission, wired/cabled connection, and the like.

The example local metering system 100 also includes a people meter 164 to capture information about the audience. The example people meter 164 may have a set of input keys, each assigned to represent a single viewer, and may prompt the audience members to indicate that they are present in the viewing audience by pressing the appropriate input key. The people meter 164 may also receive information from the home unit 124 to determine a time at which to prompt the audience members. Moreover, the home unit 124 may receive information from the people meter 164 to modify an operation of the home unit 124 (such as causing the home unit to generate one or more viewing records based on a change in the viewing audience). As will be appreciated by one having ordinary skill in the art, the people meter 164 may receive and/or transmit information using a variety of techniques, including, but not limited to, infrared (IR) transmission, radio frequency transmission, wired/cabled connection, and the like. As will also be appreciated by one having ordinary skill in the art, the people meter 164 may be implemented by a combination of the remote control device 160 and one or more of the set-top box 108, the time-shifting device 112 and/or the home unit 124. In such an implementation, the set-top box 108, the time-shifting device 112 and/or the home unit 124 may be configured to output prompting information and/or other appropriate people meter content for display directly by the television 120. Correspondingly, the remote control device 160 may be configured to accept inputs from the viewing audience and transmit these user inputs to the appropriate device responsible for generating the people meter display on the television 120.

Figure 2:
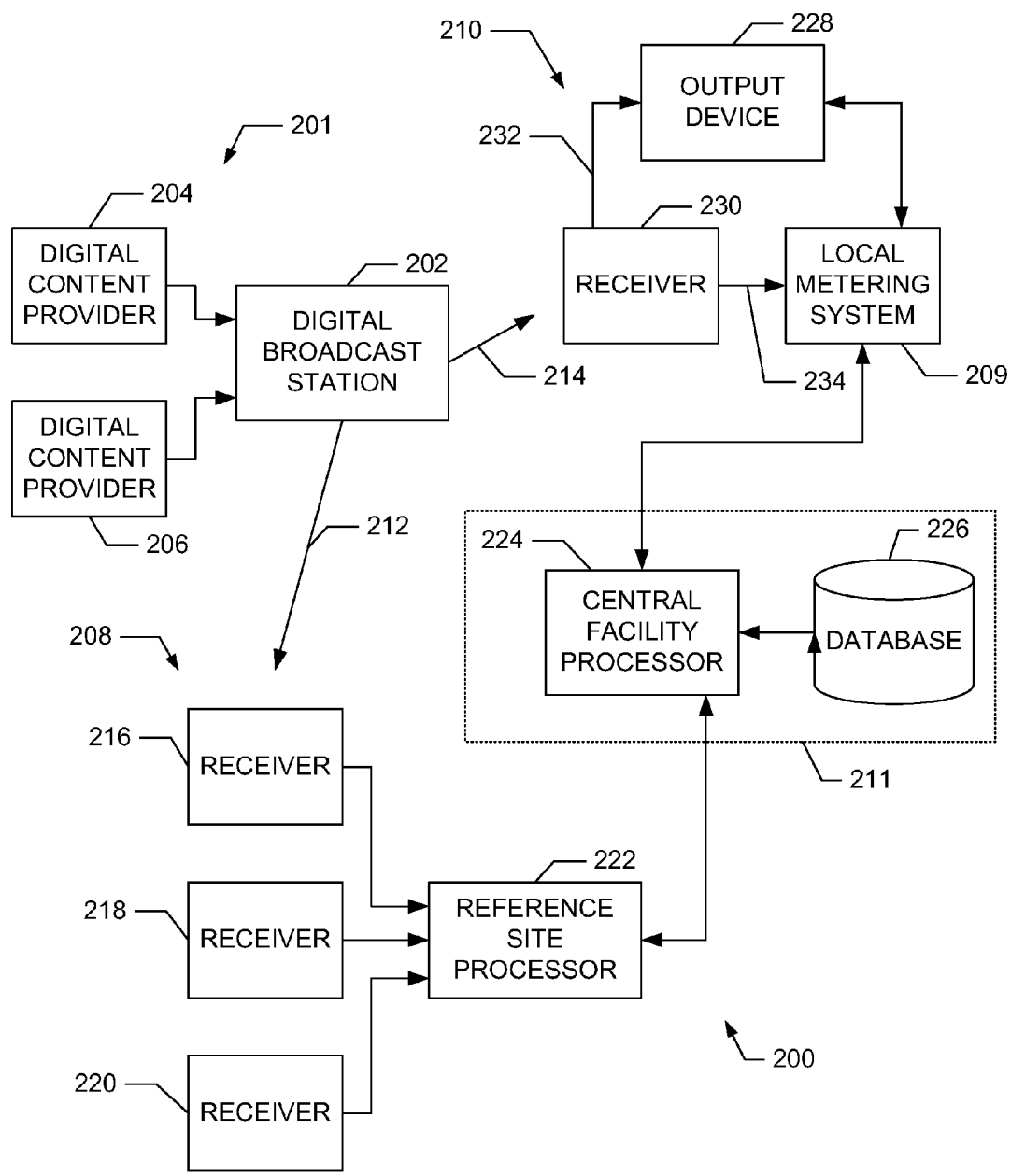
FIG. 2 is a block diagram of an example broadcast system and an example monitoring system.

FIG. 2 illustrates an example monitoring system 200 to monitor viewing of program content provided by an example broadcast system 201. The example broadcast system 201 of FIG. 2 includes a broadcast station 202 that receives audio/video content from a plurality of content providers 204 and 206. The audio/video content providers 204 and 206 may provide audio and/or video programs or information, such as television programs, advertisements, audio (e.g., radio) programs, still image information (e.g., web pages), etc., in known manners to the broadcast station 202.

The example monitoring system 200 of FIG. 2 includes one or more reference sites 208, a plurality of local metering systems 209 (for example, a set of systems similar or identical to the local metering system 100 of FIG. 1) located at a plurality of home sites 210 (which may be statistically selected to represent a larger population) and a central facility 211 to compile and process data collected by the local metering systems 209. For ease of reference, only one home site 210, one reference site 208 and one central facility 211 is shown in FIG. 2. However, persons of ordinary skill in the art will appreciate that any number of home sites 210, reference sites 208 and/or central data collection and processing facilities 211 may be employed.

The broadcast station 202 transmits one or more signals containing digital and/or analog audio/video content information. These signals are received by at least one reference site 208 and at least one statistically selected home site 210 via communication paths or links 212 and 214, respectively. The communication paths or links 212 and 214 may include any combination of hardwired or wireless links, such as satellite links, wireless land-based links, cable links, etc. The signals conveyed via the links 212 and 214 may contain multi-program analog signals and/or digital data streams which are commonly employed within existing broadcast systems.

In the example monitoring system 200, the reference site 208 includes a plurality of receivers (e.g., set-top boxes or the like) 216, 218 and 220 that simultaneously demodulate, demultiplex and/or decode audio, video and/or other information received from the broadcast station 202. In the illustrated example, each of the receivers 216, 218 and 220 provides audio and/or video information associated with a different program that is currently being broadcast to a reference site processor 222. In other words, the receiver 216 may provide audio and/or video information associated with a program A while the receivers 218 and 220 provide audio and/or video information associated with respective programs B and C. In addition, the reference site processor 222 is configured to control each of the receivers 216, 218 and 220 and/or has information indicating a program to which each of the receivers 216, 218 and 220 is tuned at any given time.

The reference site processor 222 may determine the original broadcast date/time stamps, decode reference ancillary code information and/or generate reference signature information for a plurality of simultaneously broadcast audio/video content. The reference site processor 222 sends the original broadcast time stamps and the reference code and/or signature information to a central facility processor 224 which stores the original broadcast time stamps and the reference code and/or signature information in a database 226.

The home site 210 could be, for example, a statistically selected home containing a television, a radio, a computer, etc. The home site 210 includes an output device 228 (e.g., a video display, speaker, etc., such as the television 120 of FIG. 1). The home site 210 also includes a receiver 230, such as the set-top box 108 of FIG. 1, which may be similar or identical to the receivers 216, 218 and 220. The receiver may also include a time-shifting device, such as the time-shifting device 112 of FIG. 1. Such receivers are well-known and, thus, are not described in greater detail herein. The receiver 230 provides audio and/or video signals 232 to the output device 228 that are used to present the program currently selected for consumption.

To monitor the use of the receiver 230, the home site 210 is provided with a local metering system 209, such as the local metering system 100 of FIG. 1. The local metering system 209 may include, for example, a home unit and/or a time-shifting device monitor such as the home unit 124 and the time-shifting device monitor 128. The receiver 230 provides an audio and/or a video signal 234 containing audio and/or video information associated with the currently displayed program to the local metering system 209. The local metering system 209 uses the signal 234 to decode ancillary code information and/or generate signature information corresponding to the program currently being displayed on the output device 228. The local metering system 209 stores and periodically conveys this code and/or signature information to the central facility processor 224, for example, in the form of a viewing record or set of records.

The central facility processor 224, in addition to being able to perform a variety of other processing tasks, is configured to compare code and/or signature information generated at the home site 210 to the reference code and/or signature information stored in the database 226 to identify the channels and/or programs that were displayed at the home site 210. To facilitate the comparison of code and/or signature information received from the reference site 208 to the code and/or signature information received from the home site 210, the reference site processor 222 and the local metering system 209 may generate time stamp information and associate such time stamp information with the code and/or signature information collected at the corresponding time. In this manner, the central facility processor 224 can attempt to align the code and/or signature information received from the reference sites 208 with the code and/or signature information collected at the corresponding times via the home site 210 to thereby reduce the number of comparisons required to identify a match.

As mentioned previously, existing techniques for measuring viewing behavior may not be sufficient to accurately monitor viewing behavior associated with a time-shifting device (e.g., the time-shifting device 112 of FIG. 1). Typically, existing approaches attempt to determine program content identifiers for displayed content that corresponds to a live broadcast and then cross-reference these identifiers with a database (e.g., a programming guide) based on the original broadcast time stamp (because the viewing time corresponds to the original broadcast time in the live-viewing scenario). However, in the case of time-shifted viewing, the actual viewing time may not correspond to the original broadcast time and, as such, may not be sufficient to determine an original broadcast time for the purpose of cross-referencing the programming guide. If an original broadcast time or a set of possible broadcast times is not known, a central facility processor (e.g., the central facility processor 224 of FIG. 2) may need to perform a computationally expensive brute-force search over all receivable content identifying information collected over a broad range of time to cross-reference the program content identifiers with the corresponding program reference information. Moreover, without knowledge of the original broadcast time (or at least a window of possible original broadcast times), the central facility processor 224 may be unable to break crediting ties for time-shifted viewing of content that may have been broadcast on multiple broadcast channels and/or at multiple broadcast times.

Thus, it is desirable to determine information to narrow the possible cross-referencing search window(s) for the case of time-shifting viewing of program content and, if possible, to uniquely identify the displayed content. Such information or "hints" may include an exact original broadcast time (within a tolerance that depends on the accuracy of the measurement method), a range/set of possible original broadcast times, an original broadcast channel name and/or number, a program name, a range/set of possible program record times, remote control usage information (e.g., record, play, pause, rewind and/or fast-forward), etc. A time-shifting device monitor (e.g., the time-shifting device monitor 128 of FIG. 1) may be configured to obtain one or more of these hints using, for example, one or more of the following techniques: a software meter that provides, for example, logging information such as the original record time (and thus the original broadcast time), the original broadcast channel number, the program name, etc.; a time-shifting device state tracker (e.g., a device for monitoring/processing data blocks written to and read from storage within the time-shifting device 112); an on-screen detector to detect, for example, displayed broadcast information such as the original broadcast time and channel number; a record light sensor to detect, for example, when the time-shifting device 112 is recording broadcast programs; and/or a remote control device detector to determine, for example, the operational state of the time-shifting device 112 (e.g., ON, OFF, record mode, playback mode, channel number selected, etc.). These techniques are discussed in greater detail below as part of the descriptions of FIGS. 3A-3E and 4A-4D.

Flowcharts representative of example machine readable instructions for implementing the time-shifting device monitor 128 and portions of the home unit 124 of FIG. 1 are shown in FIGS. 3A-3E. Flowcharts representative of example machine readable instructions for implementing portions of the central facility processor 224 of FIG. 2 are shown in FIGS. 4A-4D. In these examples, the processes represented by each flowchart may be implemented by sets of machine readable instructions that may comprise one or more programs for execution by a processor, such as the processor 512 shown in the example computer 500 discussed below in connection with FIG. 5. The one or more programs may be embodied in software stored on a tangible medium such as a CD-ROM, a floppy disk, a hard drive, a DVD, or a memory associated with the processor 512, but persons of ordinary skill in the art will readily appreciate that the entire program and/or parts thereof could alternatively be executed by a device other than the processor 512 and/or embodied in firmware or dedicated hardware in a well-known manner. For example, any or all of the time-shifting device monitor 128, the home unit 124 and/or the central facility processor 224 could be implemented by any combination of software, hardware, and/or firmware. Further, although the example programs are described with reference to the flowcharts illustrated in FIGS. 3A-3E and 4A-4D, persons of ordinary skill in the art will readily appreciate that many other methods of implementing the example methods and apparatus described herein may alternatively be used. For example, with reference to the flowcharts illustrated in FIGS. 3A-3E and 4A-4D, the order of execution of the blocks may be changed, and/or some of the blocks described may be changed, eliminated, combined and/or subdivided into multiple blocks.

An example program 300 to implement the time-shifting device monitor 128 and the home unit 124 (or portions thereof) of FIG. 1 is shown in FIGS. 3A-3E. The program 300 may be executed on a periodic basis (i.e., at fixed time intervals via a program loop) or may be executed in response to a change in state of one or more devices in the home entertainment system 102 and/or the local metering system 100 of FIG. 1. The example program 300 begins at block 310 of FIG. 3A at which the home unit 124 samples the state of the television 120, for example, based on a measurement from a sensor 144. If the television display is active (e.g., in an ON state) as determined at block 312, control proceeds to block 314. If the display is inactive (e.g., in an OFF state) as determined at block 312, control returns to block 310 at which the home unit 124 again samples the state of the television 120 after a predetermined delay period expires. Thus, the program 300 continues to iterate through the blocks 310 and 312 until the television 120 becomes active.

At block 314, the home unit 124 directs the time-shifting device monitor 128 to determine if program information packets corresponding to the currently displayed program are available. For example, and as discussed above, a program information packet may be received from the time-shifting device 112 over the device interface 148 and/or constructed by the time-shifting device monitor 128 from program and/or operating state information received from the time-shifting device 112 over the device interface 148. A program information packet, if present, contains identifying information for the program content currently being output by the time-shifting device 112 for display on the television 120. If a program information packet is available (block 316), control proceeds to block 318 at which the time-shifting device monitor 128 processes the information contained in the packet and provides this information to the home unit 124 via the home unit interface 152. One having ordinary skill in the art will appreciate that an equivalent implementation could have the time-shifting device monitor 128 provide the unprocessed information packet to the home unit 124 for processing. One having ordinary skill in the art will also appreciate that another equivalent implementation could combine the home unit 124 and the time-shifting device monitor 128 into a single apparatus that both receives/constructs and processes program information packets. After the information contained in the program information packet is processed, control proceeds to block 320 of FIG. 3B.

At block 320 the home unit 124 determines whether a final distributor code is present/detected in the program information packet. A final distributor code is a type of ancillary code that may contain, among other information, the original broadcast time and the broadcast channel number (e.g., via a source identifier) for the currently displayed program. As such, the final distributor code can be used to uniquely identify the program. Thus, if the final distributor code is present, control proceeds to block 322 at which the home unit 124 adds the final distributor code to a viewing record corresponding to the currently displayed program for reporting to the central facility processor 224 of FIG. 2. Control then proceeds to block 324 of FIG. 3E.

If the final distributor code is not present (block 320 of FIG. 3B), control proceeds to block 326 at which the home unit 124 determines whether information indicative of a full software metering capability in the time-shifting device 112 is available. A software meter may be, for example, a companion program that resides and executes in the time-shifting device 112 to determine and store the original broadcast time and/or channel number (and possibly other information) along with the broadcast program being recorded and stored in the time-shifting device 112. An example software meter that could be adapted for use with the example program 300 is described in, for example, PCT Application Serial No. PCT/US98/14286, entitled "Audience Measurement System for Digital Television" and filed on May 12, 1998. PCT Application Serial No. PCT/US98/14286 is hereby incorporated by reference in its entirety.

A full software meter typically provides broadcast time along with channel number and/or station identification (ID) (e.g., station call letters), whereas a partial software meter typically provides only the original broadcast time. If full software meter information is available (block 326), control proceeds to block 328 at which the home unit 124 adds the original broadcast time and broadcast channel number/station ID to a viewing record corresponding to the currently displayed program for reporting to the central facility processor 224.

Figure 3A:
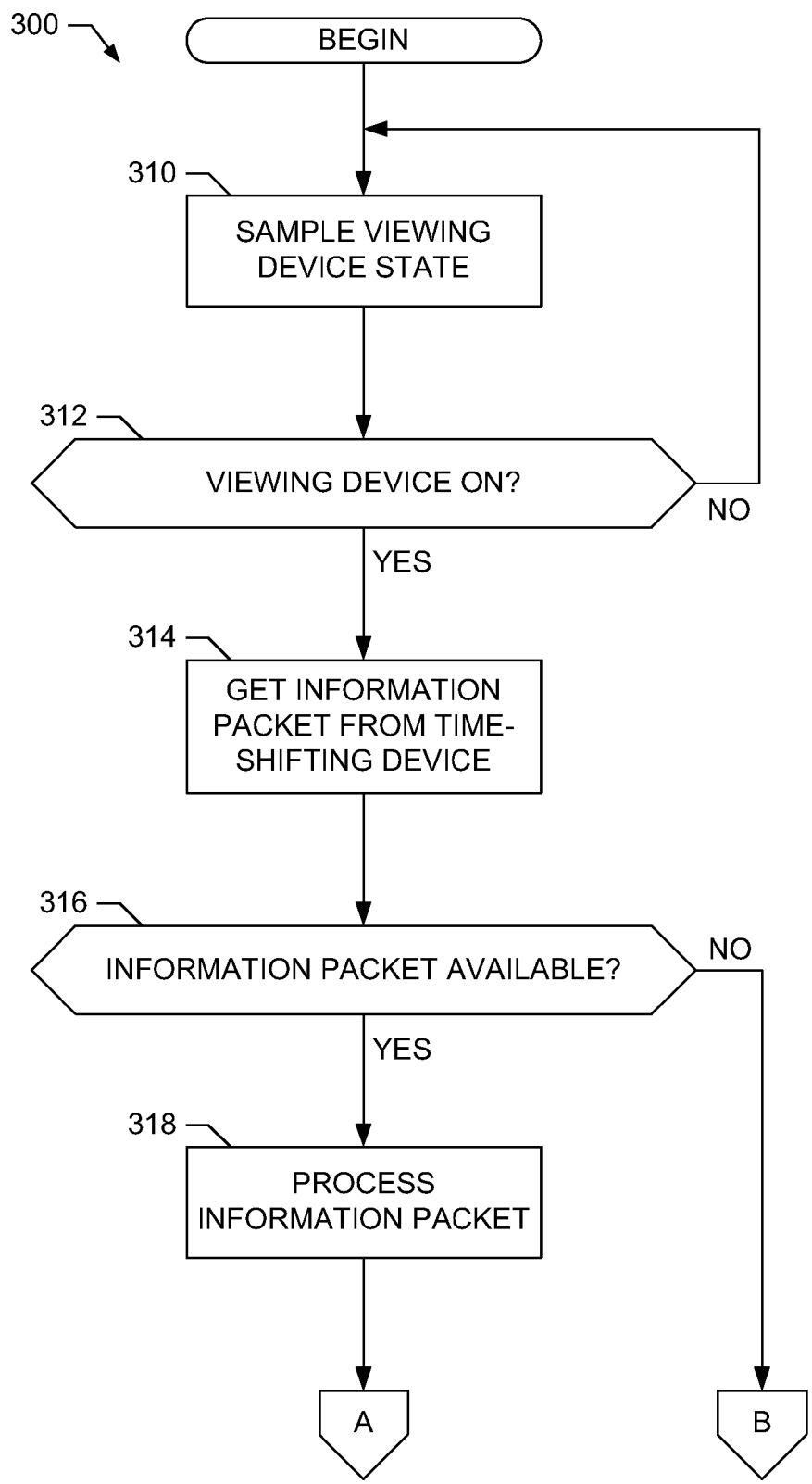

If the original broadcast time is not explicitly included in the program information packet, the home unit 124 may derive the original broadcast time from other available information. For example, the original broadcast time may be derived from a current time (such as a date and time-of-day maintained by a real-time clock in the home-unit 124), a record time (such as a relative/local time at which the time-shifting device 112 wrote the data packets corresponding to the currently displayed program to memory) and a playback time (such as a relative/local time at which the time-shifting device 112 read the data packets corresponding to the currently displayed program from memory) using the equation:

original broadcast time=current time−(deltatime), where delta time is equal to the difference between the playback time and the record time, i.e., (delta time=playback time−record time). Referring also to FIG. 3A1, in one embodiment, software (represented by the block 318 in FIG. 3A) used to calculate delta time may employ a multi-threaded structure wherein different program threads are used to perform different functions in an autonomous manner relative to one another. For example, one thread (shown via the blocks 318A-318F) may be configured to receive bus information from a bus analyzer/bus sniffer (block 318A). Such bus information may include, for example, a memory address and an indication that media/data was read from the memory address, indicating that media at that address was selected for display/presentation, i.e., played back. Such bus information may instead include a memory address and an indication that media/data was written to the memory address (indicating that media has been stored at that memory address for later retrieval/viewing, i.e., recorded). If an address with a write indication is received from the bus analyzer (block 318B), the software may cause the memory address to be stored as well as the time at which media was stored at the memory address, i.e., the record time (block 318C) and the software may then return to the block 318A for further bus information. If an address with a read indication is received from the bus analyzer (318D), the software searches memory for the received address and the record time associated therewith and subtracts the record time from a playback time associated with the reading of media/data located at the same address to thereby generate the delta time which represents the time between storage and retrieval of the data/media at the given address (318F). If neither a read event nor a write event is indicated, the bus information may be discarded or processed using one or more other routines (318E). Another program thread (not shown) may be adapted to communicate the calculated delta time information to a system module (or other system equipment) that calculates the original broadcast time using the current time and the delta time as indicated in the preceding equation. One or more program threads (not shown) may also be used to communicate other information to the remainder of the metering system. Using a multi-threaded program structure to perform the delta time calculations helps to reduce latency issues that might otherwise be caused by using a non-threaded program structure that performs all of the calculating and communicating functions in a more serial fashion. Specifically, a multi-threaded program structure allows the times associated with the occurrence of the various read activities (i.e., a set of presentation times) and write activities to be collected without delay which improves the accuracy of the resulting calculations. This approach for determining the original broadcast is especially useful in scenarios in which the home unit 124 includes a real-time clock that is able to provide a current date and time but the time-shifting device 112 and/or the time-shifting device monitor 128 are limited to providing only relative times due to lack of a real-time clock capability. In any case, control then proceeds to block 324 of FIG. 3E.

If full software meter information is not available (block 326 of FIG. 3B), control proceeds to block 330 at which the home unit 124 determines whether information indicative of a time-shifting device state tracker with channel ID capability is available. A time-shifting device state tracker may correspond to functionality included in the time-shifting device monitor 128 or a separate device that may be coupled, for example, between the time-shifting device 112 and the time-shifting device monitor 128. Examples of memory/bus analyzers that could be adapted to implement the time-shifting device state trackers discussed herein are described in, for example, U.S. Pat. No. 5,488,408, entitled "Serial Data Channel Metering Attachment for Metering Channels to Which a Receiver is Tuned" and filed on Mar. 22, 1994, and PCT Application Serial No. PCT/US2002/038012, entitled "Apparatus and Methods for Tracking and Analyzing Digital Recording Device Event Sequences" and filed on Nov. 27, 2002. U.S. Pat. No. 5,488,408 and PCT Application Serial No. PCT/US2002/038012 are hereby incorporated by reference in their entirety.

The time-shifting device state tracker samples the internal state of the time-shifting device 112 during the recording of a broadcast program (for example, over the device interface 148) and may be configured to append information containing, for example, the original broadcast time, channel number and/or station ID, the program record (write data to memory/storage) time, the program playback (read data from memory/storage) time, etc., to the broadcast program being recorded and stored in the time-shifting device 112. Thus, a time-shifting device state tracker configured to capture, for example, a channel number and/or station ID is said to have channel ID capability. Time-shifting device state tracker functionality may reside in the time-shifting device monitor 128 or in a stand-alone device. If time-shifting device state tracker with channel ID information is available (block 330), control proceeds to block 328 at which the home unit 124 adds the original broadcast time (or a derived version of the original broadcast time as described above) and broadcast channel number/station ID to a viewing record corresponding to the currently displayed program for reporting to the central facility processor 224. Control then proceeds to block 324 of FIG. 3E.

Figure 3B:
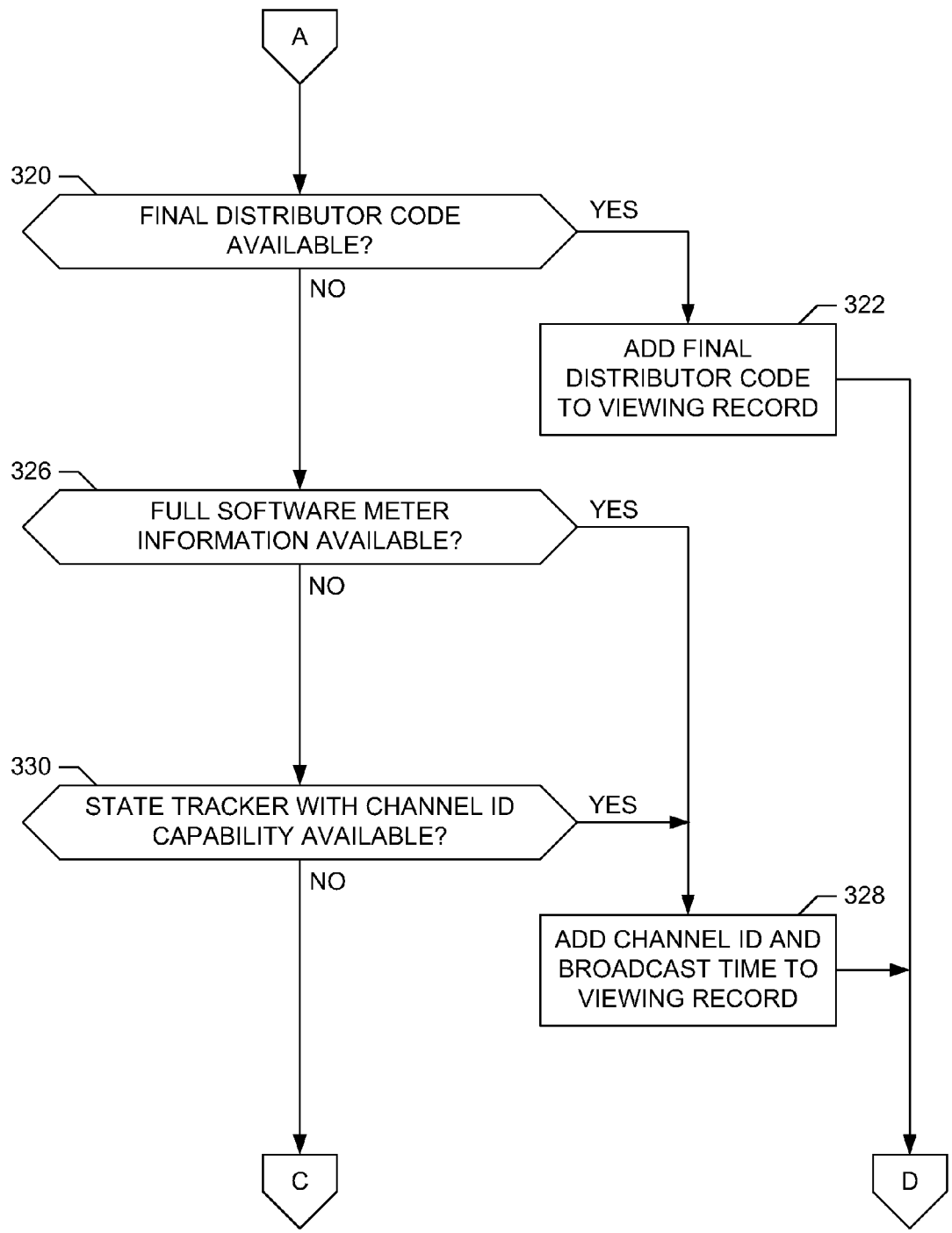
Figure 3C:
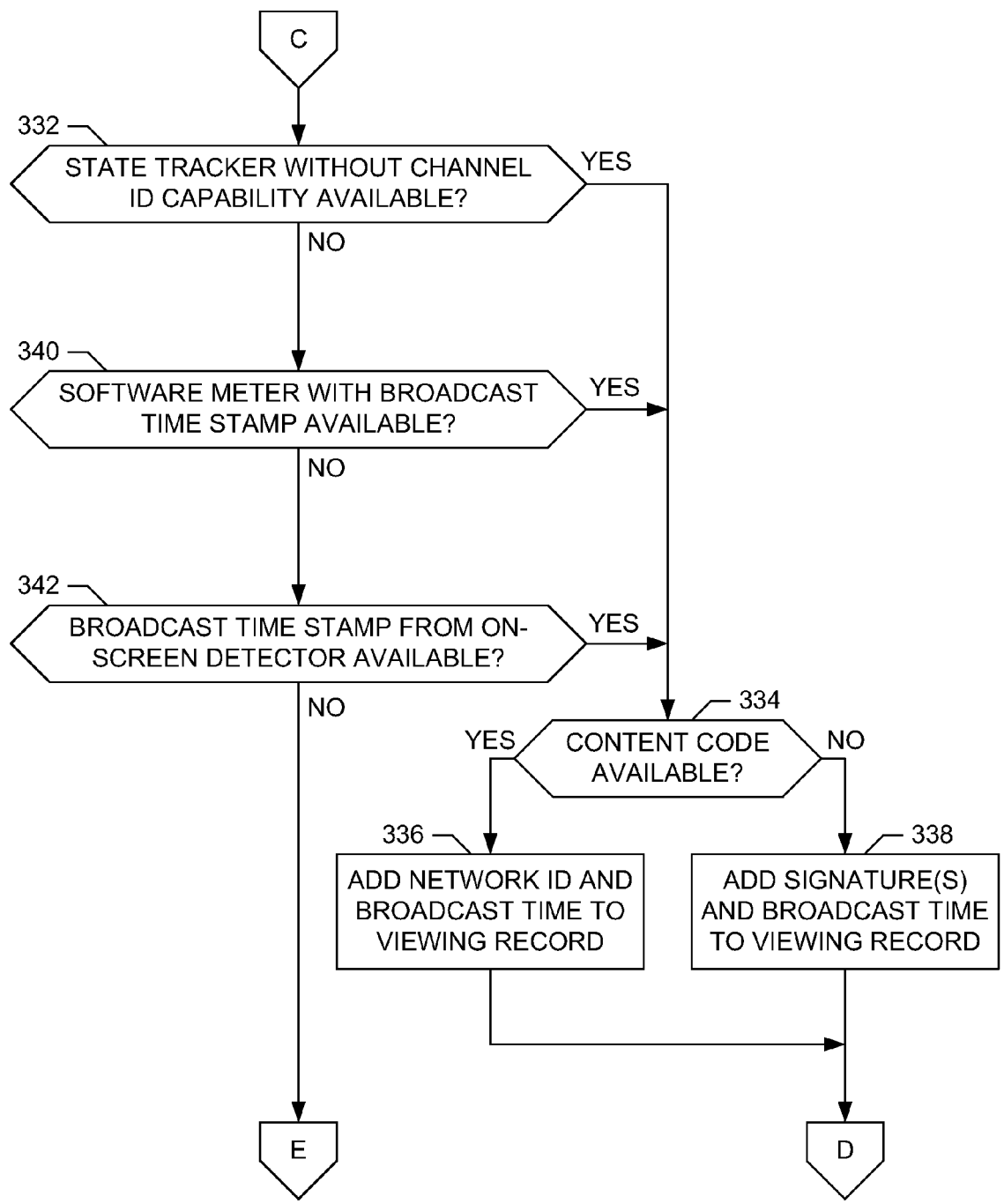

If a time-shifting device state tracker with channel ID information is not available (block 330 of FIG. 3B), control proceeds to block 332 of FIG. 3C at which the home unit 124 determines whether information indicative of a time-shifting device state tracker without channel ID capability is available (e.g., the original broadcast time is present, but not the original broadcast channel number/station ID). If such information is available (block 332), control proceeds to block 334 at which the home unit 124 determines whether a program content code is included in the information provided by the time-shifting device monitor 128. The program content code includes information to identify the program currently being output by the time-shifting device 112 for display on the television 120. This information may include, for example, the broadcast network ID (e.g., via a source identifier) corresponding to the displayed program. Example audio and video coding techniques that could be adapted for including and retrieving program content codes from broadcast programs are described in, for example, U.S. Pat. No. 5,481,294, entitled "Audience Measurement System Utilizing Ancillary Codes and Passive Signatures" and filed on Oct. 27, 1993. Example techniques that could be adapted to embed audio program content codes such that the codes are inaudible are described in, for example, U.S. Pat. No. 6,272,176, entitled "Broadcast Encoding System and Method" and filed on Jul. 16, 1998, and PCT Application Serial No. PCT/US01/10790, entitled "Multi-Band Spectral Audio Encoding" and filed on Apr. 3, 2001. Example techniques for embedding video program content codes that could be adapted for use herein are described in, for example, U.S. Pat. No. 5,629,739, entitled "Apparatus and Method for Injecting an Ancillary Signal into a Low Energy Density Portion of a Color Television Frequency Spectrum" and filed on Mar. 6, 1995, and U.S. Pat. No. 5,737,025, entitled "Co-Channel Transmission of Program Signals and Ancillary Signals" and filed on Feb. 28, 1995. U.S. Pat. Nos. 5,481,294, 6,272,176, 5,629,739, 5,737,025 and PCT Application Serial No. PCT/US01/10790 are hereby incorporated by reference in their entirety.

If the content code is available (block 334), control proceeds to block 336 at which the home unit 124 adds the original broadcast time (or a derived version of the original broadcast time as described above) and the program content code (i.e., broadcast network identification) to a viewing record corresponding to the currently displayed program for reporting to the central facility processor 224. If the content code is not available (block 334), control proceeds to block 338 at which the home unit 124 generates one or more program signatures and adds the original broadcast time (or a derived version of the original broadcast time as described above) and the program signatures to the viewing record corresponding to the currently displayed program. The home unit 124 may generate the program signatures using any of the well-known techniques for generating signatures based on, for example, the video and/or audio portions of the program currently being displayed by the television 120 or emitted by the television speakers, respectively. U.S. Pat. No. 5,481,294, discussed above and incorporated herein, describes example audio and video signaturing techniques that could be adapted for use herein. Additional example audio signaturing techniques that could be adapted for use herein are described in, for example, U.S. Pat. No. 5,918,223, entitled "Method and Article of Manufacture for Content-Based Analysis, Storage, Retrieval, and Segmentation of Audio Information" and filed on Jul. 21, 1997, and U.S. application Ser. No. 10/200,034, entitled "Automatic Identification of Sound Recordings" and filed on Jul. 22, 2002. Additional example video signaturing techniques that could be adapted for use herein are described in, for example, U.S. Pat. No. 6,633,651, entitled "Method and Apparatus for Recognizing Video Sequences" and filed on Nov. 1, 1999, and U.S. Pat. No. 6,577,346, entitled "Recognizing a Pattern in a Video Segment to Identify the Video Segment" and filed on Jan. 24, 2000. U.S. Pat. Nos. 5,481, 294, 5,918,223, 6,633,651, 6,577,346 and U.S. application Ser. No. 10/200,034 are hereby incorporated by reference in their entirety.

One having ordinary skill in the art will appreciate that the home unit 124 may be configured to generate program signatures and include such signatures in the viewing record regardless of the presence of a program content code or any other type of ancillary code. Irrespective of whether control passes through block 336 or block 338, control then proceeds to block 324 of FIG. 3E.

If a time-shifting device state tracker without channel ID capability is also not available (block 332 of FIG. 3C), control proceeds to block 340 at which the home unit 124 determines whether information indicative of a partial software metering capability is available (e.g., the original broadcast time is present, but not the original broadcast channel number/station ID). If such information is available (block 332), control proceeds to block 334 and continues as described above.

If partial software meter information is not available (block 340), control proceeds to block 342 at which the home unit 124 determines whether a sensor 144 such as an on-screen detector is present and configured to read a broadcast time stamp displayed on the television 120. A broadcast time stamp may be displayed on the television 120, for example, if the time-shifting device 112 is configured to store the original broadcast time of a recorded program and to cause a corresponding time stamp to be displayed on the television 120 during an initial period of time when the recorded program is replayed for viewing. If a broadcast time stamp is available (block 342), control proceeds to block 334 and continues as described above.

Figure 3D:
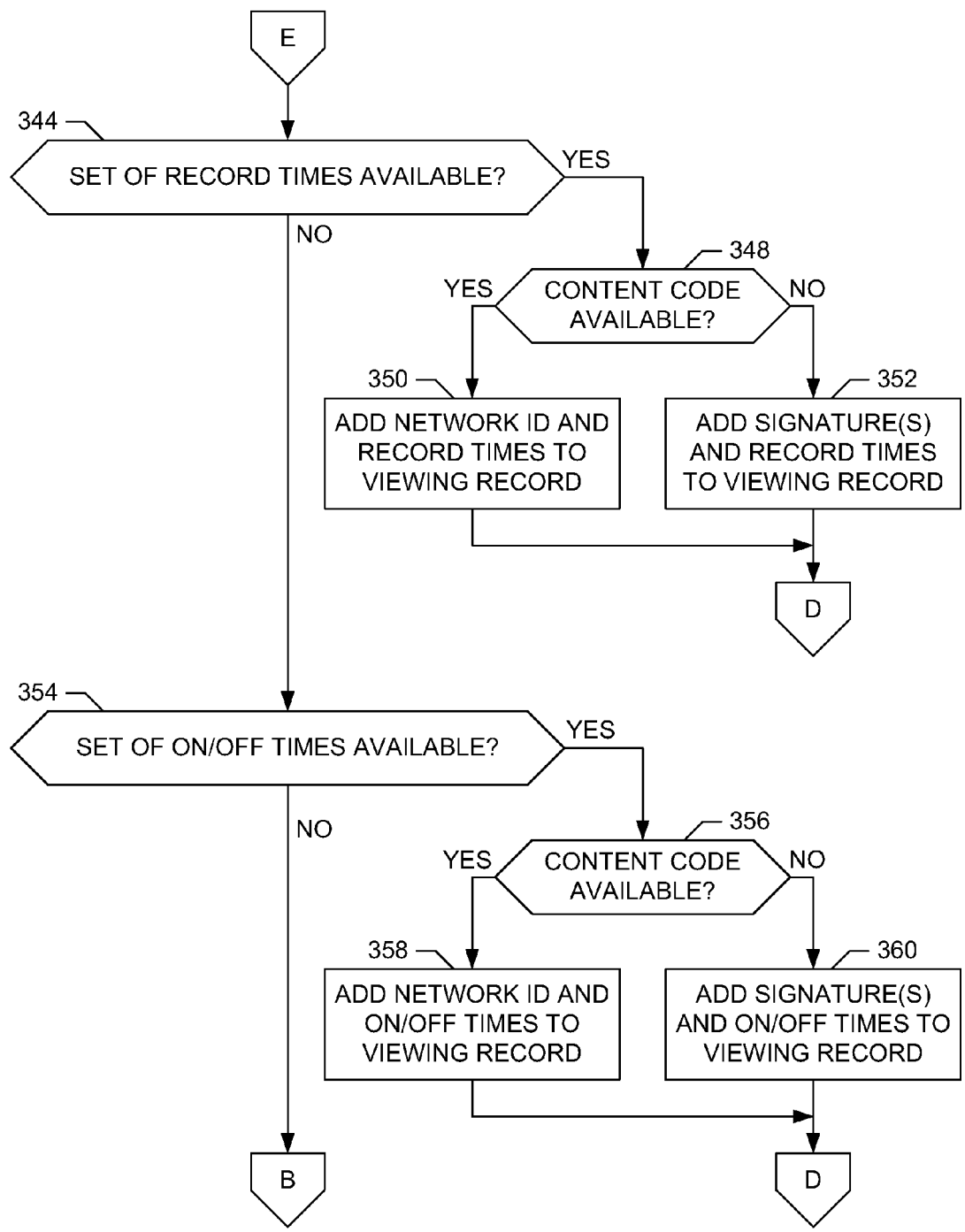

If a broadcast time stamp is not available (block 342), control proceeds to block 344 of FIG. 3D at which the home unit 124 determines whether the time-shifting device monitor 128 provided a set of record times indicating intervals of time during which the time-shifting device 112 was configured to record a broadcast program. The set of record times may be generated based on a sensor or sensors 156 configured to measure, for example, the record light of the time-shifting device and/or the corresponding control signals generated by the remote control device 160. If the set of record times is available (block 344), control proceeds to block 348 at which the home unit 124 determines whether a program content code is included in the information provided by the time-shifting device monitor 128. If the content code is available (block 348), control proceeds to block 350 at which the home unit 124 adds the set of record times and the program content code (i.e., broadcast network identification) to a viewing record corresponding to the currently displayed program for reporting to the central facility processor 224. If the content code is not available (block 348), control proceeds to block 352 at which the home unit 124 adds the set of record times and one or more program signatures to the viewing record corresponding to the currently displayed program. As mentioned previously, one having ordinary skill in the art will appreciate that the home unit 124 may be configured to add program signatures to the viewing record regardless of the presence of a program content code or any other type of ancillary code. Irrespective of whether control passes through block 350 or block 352, control then proceeds to block 324 of FIG. 3E.

If a set of record times is not available (block 344 of FIG. 3D), control proceeds to block 354 at which the home unit 124 determines whether the time-shifting device monitor 128 provided a set of ON/OFF times indicating intervals of time during which the time-shifting device 112 was switched from an OFF state to an ON state and back to an OFF state (i.e., intervals of time during which the time-shifting device 112 was enabled). The set of ON/OFF times may be generated based on a sensor or sensors 156 configured to measure the operating state of the time-shifting device (for example, a sensor 156 configured to measure changes in power supply current draw due to switching between OFF and ON states and/or a sensor 156 configured to monitor a power-on light associated with the time-shifting device). If the set of ON/OFF times is available (block 354), control proceeds to block 356 at which the home unit 124 determines whether a program content code is included in the information provided by the time-shifting device monitor 128. If the content code is available (block 356), control proceeds to block 358 at which the home unit 124 adds the set of ON/OFF times and the program content code (i.e., broadcast network identification) to a viewing record corresponding to the currently displayed program for reporting to the central facility processor 224. If the content code is not available (block 356), control proceeds to block 360 at which the home unit 124 adds the set of ON/OFF times and one or more program signatures to the viewing record corresponding to the currently displayed program. As mentioned previously, one having ordinary skill in the art will appreciate that the home unit 124 may be configured to add program signatures to the viewing record regardless of the presence of a program content code or any other type of ancillary code. Irrespective of whether control passes through block 358 or block 360, control then proceeds to block 324 of FIG. 3E.

Figure 3E:
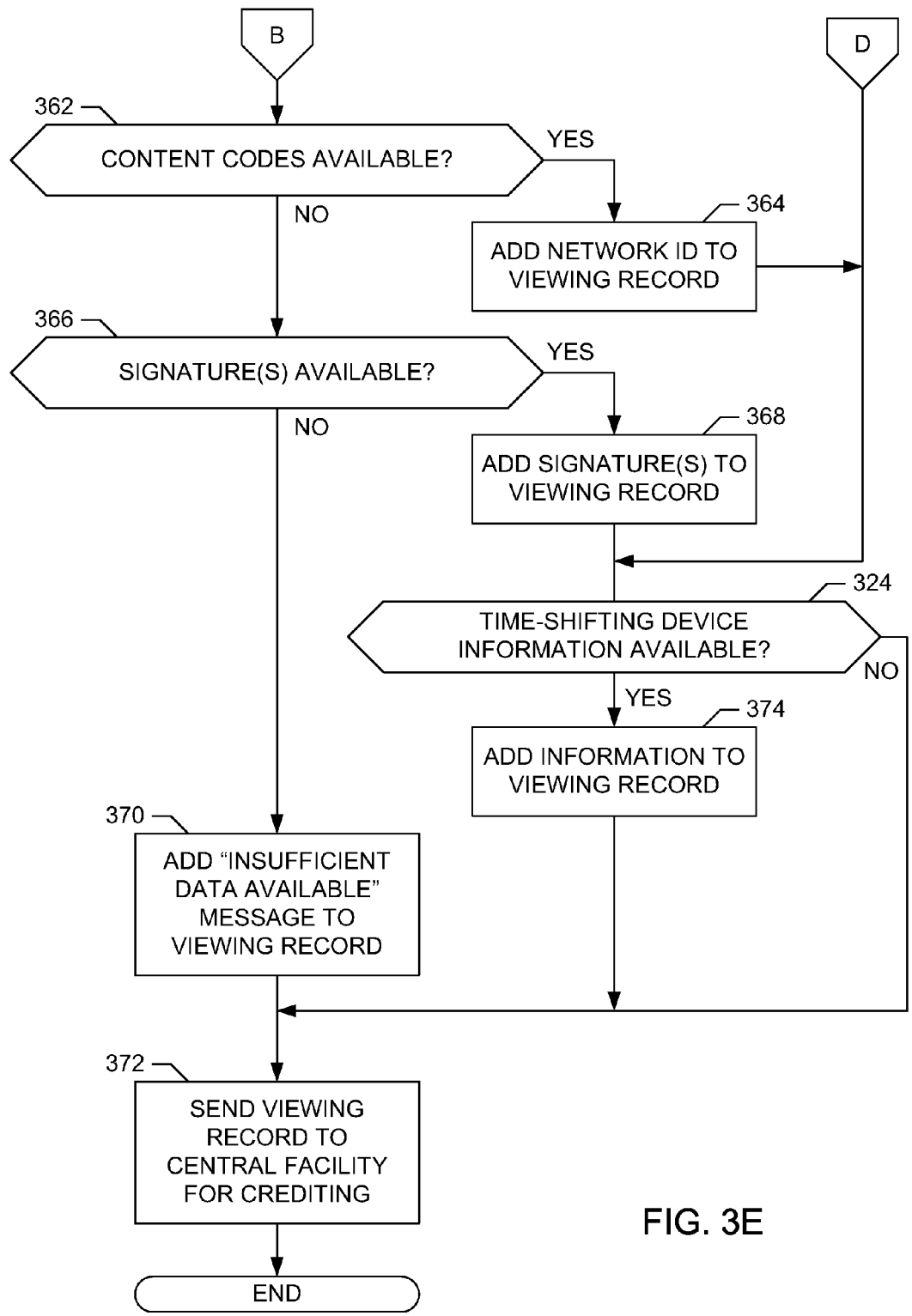

If a set of ON/OFF times is not available (block 354), control proceeds to block 362 of FIG. 3E at which the home unit 124 determines whether a program content code is included in the information provided by the time-shifting device monitor 128. Block 362 may also be reached from block 316 of FIG. 3A if the home unit 124 determines that a program information packet corresponding to the currently displayed program content is not available. In either case, if the content code is available (block 362), control proceeds to block 364 at which the home unit 124 adds the program content code (i.e., broadcast network identification) to a viewing record corresponding to the currently displayed program for reporting to the central facility processor 224. As mentioned previously, one having ordinary skill in the art will appreciate that the home unit 124 may be configured to also add program signatures to the viewing record even if a program content code or any other type of ancillary code is present. Control then proceeds to block 324.

If the content code is not available (block 362), control proceeds to block 366. If the home unit 124 is configured to generate program signatures (block 366), control proceeds to block 368 at which the home unit 124 adds the one or more program signatures to the viewing record corresponding to the currently displayed program. Control then proceeds to block 324. If the home unit 124 is not configured to generate program signatures (block 366), control proceeds to block 370 at which the home unit 124 updates the viewing record to indicate that insufficient data is available to identify the currently displayed program. Control proceeds to block 372 at which the home unit 124 sends the viewing record to the central facility processor 224 for crediting. Prior to sending the viewing record, the home unit 124 may add additional program-related information to the viewing records, such as any available ancillary codes and/or program signatures, to assist the central facility processor 224 with identifying and metering the displayed program content. The example program 300 then terminates. One having ordinary skill in the art will recognize that the home unit 124 may be configured to postpone sending the current viewing record to the central facility processor 224 until a predetermined interval has elapsed (e.g., a predetermined interval of time or an interval based on a predetermined number or sequence of events).

At block 324, the home unit 124 determines whether the time-shifting device monitor 128 provided any additional information specific to the operation of the time-shifting device 112 during the display of the previously recorded program on the television 120. Such information may include time intervals corresponding to specific states of the time-shifting device 112, as well as any other information that may be of interest in the generation of program ratings/metering reports. For example, a time interval corresponding to a fast-forward state may be used to indicate that the corresponding portion of the currently displayed program was not actually viewed by the viewing audience. As another example, a time interval corresponding to an audio-mute state may also be used to indicate that the audio portion of the currently displayed program was not actually heard by the viewing audience. If information specific to the operation of the time-shifting device 112 is available (block 324), control proceeds to block 374 at which the home unit 124 adds this information to the viewing record corresponding to the currently displayed program for reporting to the central facility processor 224. Control then proceeds to block 372 and continues as described above. If information specific to the operation of the time-shifting device 112 is not available (block 324), control proceeds directly to block 372 and continues as described above.

One having ordinary skill in the art will appreciate that the example program 300 of FIGS. 3A-3E is organized to ascertain the most detailed and accurate identification information possible for the currently displayed program. Specifically, the example program 300 is organized such that the home unit 124 initially focuses on creating a viewing record that includes the original broadcast time. The original broadcast time is a particularly useful piece of information because it may be used with many other program identifiers (e.g., a channel number, an ancillary code, a signature, etc.) to allow a central facility, such as the central facility 211 of FIG. 2, to cross-reference a program listing to uniquely identify the associated program. Thus, the home unit 124 first attempts to create a viewing record that contains, at least, the original broadcast time and channel number/station ID corresponding to the currently displayed program. If such information is not available, the home unit 124 then attempts to create a viewing record that contains the original broadcast time and additional program identification information (such as a program content code and/or a program signature or set of signatures). If such information is not available, the home unit 124 then attempts to create a viewing record that contains program identification information (such as a program content code and/or a program signature or set of signatures) and a set of possible broadcast times (such as a set of record times or a set of ON/OFF times for the time-shifting device 112). Finally, if no information corresponding to an actual or a set of possible original broadcast times is available, the home unit 124 attempts to create a viewing record that contains, at least, program identification information (such as a program content code and/or a program signature or signatures). One having ordinary skill in the art will also recognize that the viewing records generated by the home unit 124 may include additional information based on the capabilities of the time-shifting device 112 and/or the time-shifting device monitor 128 (e.g., additional software meter information, additional time-shifting device state tracker information, etc.).

In some scenarios, it may be desirable to modify the example program 300 to allow the local metering system 100 to report as much viewing/metering information as possible to the central facility 211. Viewing/metering information determined by multiple collection methods but corresponding to a single displayed program may be used by the central facility 211 to validate the accuracy of the credited results for the viewing program. For example, if a second broadcast station re-broadcasts content originally aired by a first broadcast station, the viewing/metering information determined by a single collection method may not be sufficient to determine which broadcast station transmitted the actually displayed programming content. Additionally, if as complete a set of viewing/metering information as possible is reported to the central facility 211, any modifications to the method(s) used to credit program content may be limited to a single location (such as the central facility 211) rather than distributed among the central facility 211 and all home sites (such as the local metering systems 100).

In the case of the program 300 of FIG. 3, an example modification to provide additional ratings information could be to have control flow from block 322 to block 326, rather than to block 324 as depicted in FIGS. 3B and 3E. Such a modification would allow the program 300 to collect information (e.g., program content codes and/or signatures) in addition to an available final distribution code. One having ordinary skill in the art will recognize that similar modifications may be made at various points in the example program 300 (e.g., corresponding to blocks 326, 330, 332, 340, 342, 344, 354, 362 and/or 366) to facilitate the reporting of additional information after viewing/metering information is determined by a particular collection method.

An example program 400 to implement portions of the central facility processor 224 of FIG. 2) is shown in FIGS. 4A-4D. The program 400 may be executed on a periodic basis (i.e., at fixed time intervals via a program loop) or may be executed in response to an event (e.g., the receipt of one or more viewing records from the home unit 124 of FIG. 1). The example program 400 begins at block 410 of FIG. 4A at which the central facility processor 224 receives a viewing record from, for example, the home unit 124 over the connection 140 of FIG. 1. The central facility processor 224 examines the contents of the viewing record to determine whether sufficient information is available to identify the displayed program content corresponding to the viewing record (block 412). If sufficient information is not present (block 412), control proceeds to block 414 at which the central facility processor 224 generates a report indicating that no crediting is possible based on the information contained in the received viewing record. The program 400 then terminates.

If sufficient information is present in the viewing record (block 412), control proceeds to block 416 at which the central facility processor 224 determines whether a final distributor code is available in the viewing record. If the final distributor code is available (block 416), control proceeds to block 418 at which the central facility processor 224 uses the original broadcast time and channel number/station ID information contained in the final distributor code to cross-reference a corresponding program listing in the database 226 to determine program ID information (e.g., name, episode number, etc.) corresponding to the displayed program content associated with the received viewing record. Then, at block 420, the central facility processor 224 generates a ratings/metering report containing, for example, the program ID, station ID, the original broadcast time corresponding to the displayed program content, a set of statistical characteristics that may describe the audience demographics corresponding to the specific program, etc.

If a time-shifting device (such as the time-shifting device 112 of FIG. 1) was used to cause the display of the displayed program content, the viewing record may contain information specific to the operation of that device. If information specific to the operation of the time-shifting device 112 is available (block 422), control then proceeds to block 424 at which the central facility processor 224 may use the associated information to modify the ratings/metering report generated for the displayed program content. For example, the central facility processor may change the crediting given to a displayed program if the time-shifting device 112 was placed in an audio-mute and/or fast-forward state during viewing of the program content. The program 400 terminates after the report is modified (block 424) or if there is no additional information to process that is specific to the operation of time-shifting device (block 422).

Figure 4A:
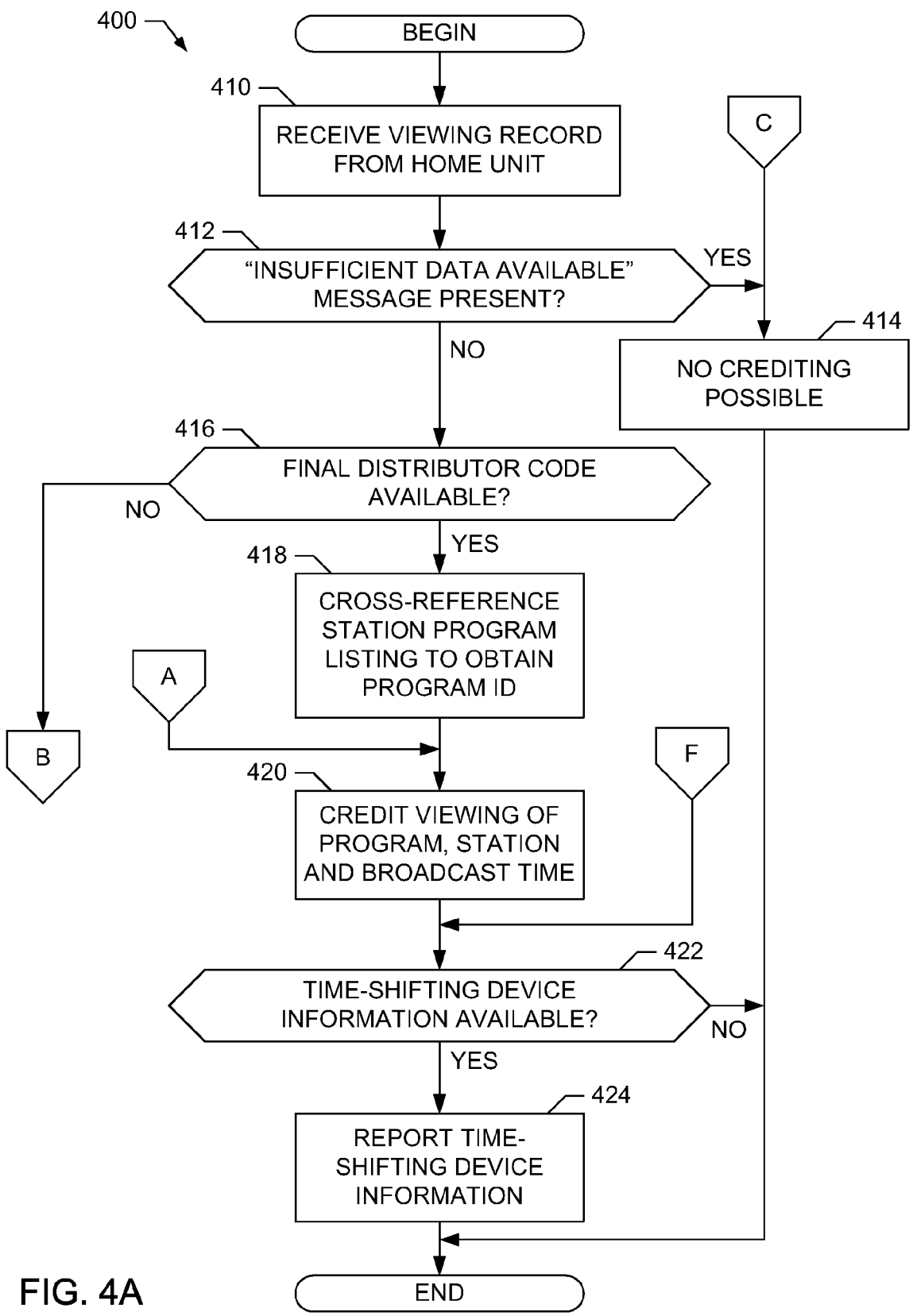
FIGS. 4A-4D are flowcharts representative of example machine readable instructions which may be executed on a machine to implement at least portions of the central facility processor of FIG. 2.
Figure 4B:
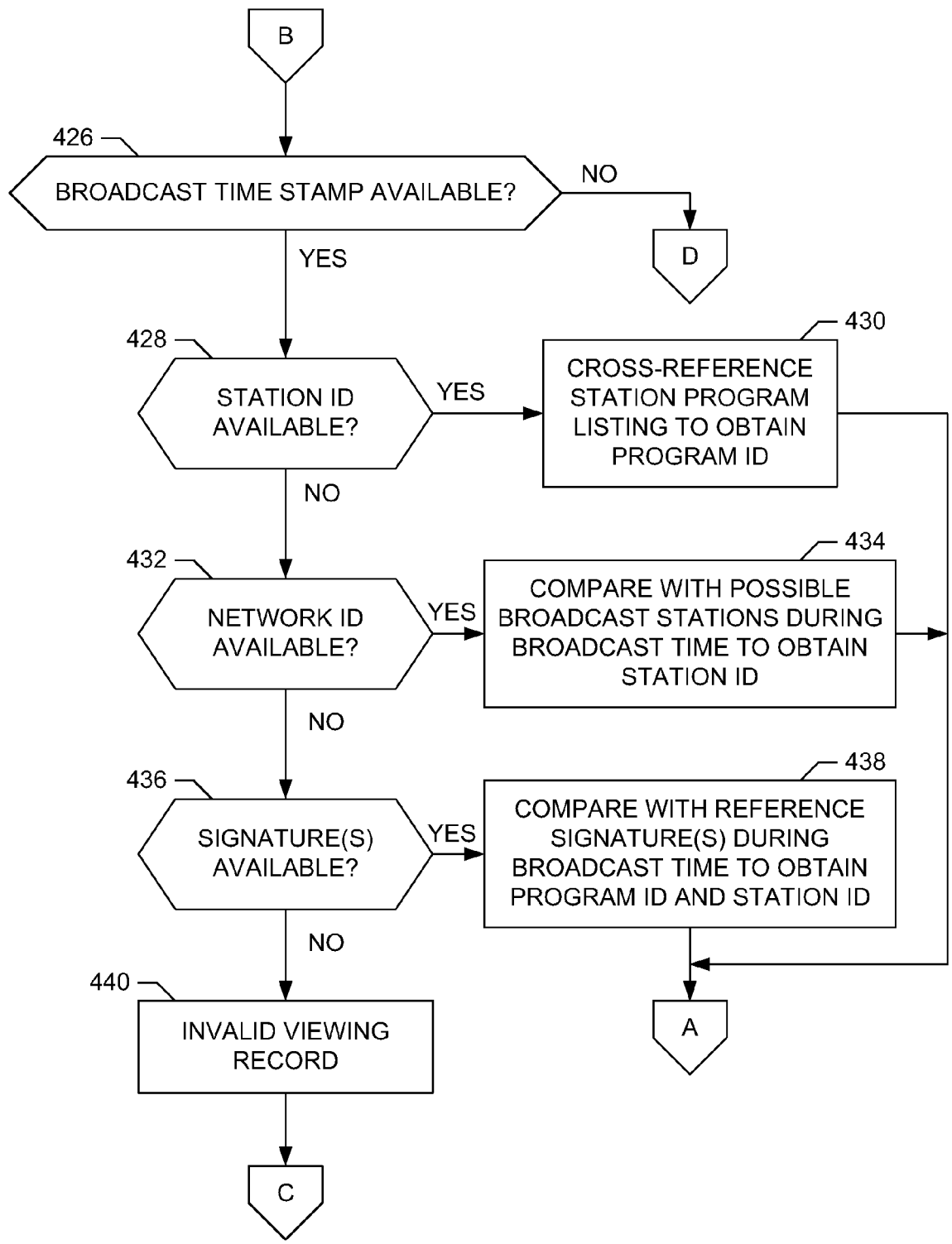

If a final distributor code is not present (block 416), control proceeds to block 426 of FIG. 4B at which the central facility processor 224 determines whether the viewing record contains original broadcast time information (e.g., a broadcast time stamp) for the associated displayed program content. If a broadcast time stamp is available (block 426), control proceeds to block 428 at which the central facility processor 224 determines whether channel number/station ID information is also included in the viewing record. If such information is available (block 428), control proceeds to block 430 at which the central facility processor 224 uses the original broadcast time and channel number/station ID information to cross-reference a corresponding program listing to determine the program ID corresponding to the displayed program content associated with the received viewing record. Control then proceeds to block 420 of FIG. 4A and continues as described above.

If channel number/station ID information is not available (block 428 of FIG. 4B), control proceeds to block 432 at which the central facility processor 224 determines whether broadcast network ID information is included in the viewing record (e.g., based on a program content code). If broadcast network ID information is available (block 432), control proceeds to block 434 at which the central facility processor 224 determines all possible broadcast stations/channels that could be received by the home entertainment system 102 of FIG. 1. The central facility processor 224 then cross-references the network ID contained in the viewing record against all possible reference network IDs corresponding to programs broadcast on the possible broadcast stations/channels and having broadcast times that coincided with the broadcast time stamp identified at block 426. Once a matching reference network ID is found, the central facility processor 224 may use the known reference network ID to determine the broadcast channel number/station ID corresponding to the displayed program content. Control then proceeds to block 420 of FIG. 4A and continues as described above.

If broadcast network ID information is not available (block 432 of FIG. 4B), control proceeds to block 436 at which the central facility processor 224 determines whether any program signatures were included in the viewing record. If one or more signatures are available (block 436), control proceeds to block 438 at which the central facility processor 224 cross-references the signature(s) contained in the viewing record against all possible reference signatures corresponding to programs whose original broadcast coincided with the broadcast time stamp identified at block 426. Once a matching reference signature is found, the central facility processor 224 can use the known reference signature to determine the broadcast channel number/station ID and/or program ID corresponding to the displayed program content. Control then proceeds to block 420 of FIG. 4A and continues as described above.

If at block 436 of FIG. 4B the central facility processor 224 determines that no signature information is available, then a viewing record was received that contains a broadcast time stamp but no program identifying information. Thus, control proceeds to block 440 at which the central facility processor 224 determines that an invalid viewing record was received. Control then proceeds to block 414 of FIG. 4A and continues as described above.

Figure 4C:
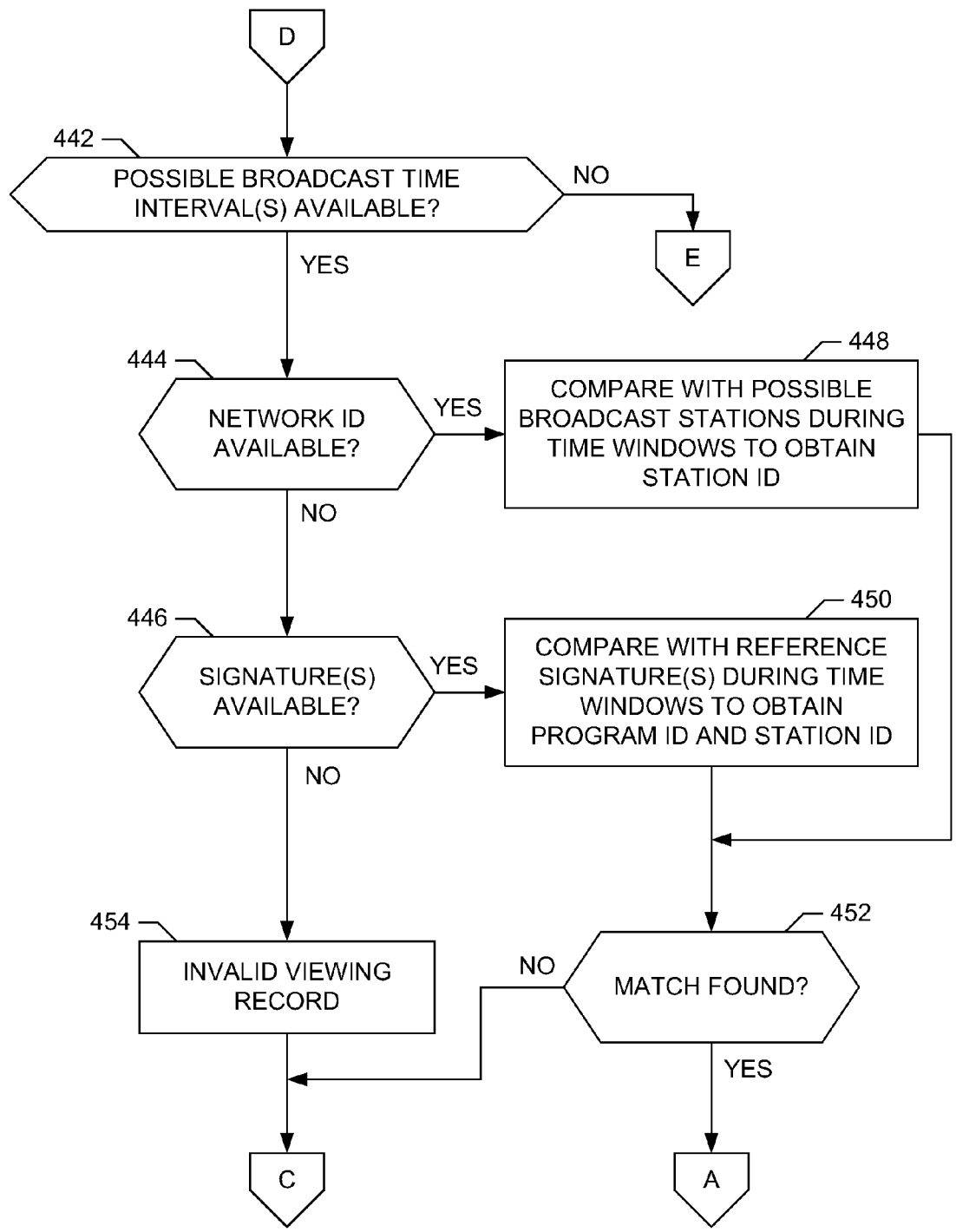

If original broadcast time information is not available (block 426), control proceeds to block 442 of FIG. 4C at which the central facility processor 224 determines whether the viewing record contains a set of possible broadcast time intervals, for example, corresponding to a set of record time and/or ON/OFF times associated with the time-shifting device 112. If a set of possible broadcast time intervals is available (block 442), control proceeds to blocks 444 and/or 446 at which the central facility processor 224 determines whether program identification information, such as a broadcast network ID (e.g., based on a program content code) or a program signature or signatures, is available. If a broadcast ID is available (block 444), control proceeds to block 448 at which the central facility processor 224 determines all possible broadcast stations/channels that could be received by the home entertainment system 102 of FIG. 1. The central facility processor 224 then cross-references the network ID contained in the viewing record against all possible reference network IDs corresponding to programs broadcast on the possible broadcast stations/channels and whose original broadcast occurred during the set of possible broadcast time intervals identified at block 442. If a network ID is not available (block 444) but one or more signatures are available (block 446), control proceeds to block 450 at which the central facility processor 224 cross-references the signature(s) contained in the viewing record against all possible reference signatures corresponding to programs whose original broadcast occurred during the set of possible broadcast time intervals identified at block 442. If the cross-referencing operations of blocks 448 or 450 yield a match at block 452, the central facility processor 224 uses the reference broadcast network ID or signature(s) to determine the broadcast time, channel number/station ID and/or program ID corresponding to the displayed program content, and control then proceeds to block 420 of FIG. 4A and continues as described above. If a match is not found (block 452) or if program identification is not available in the viewing record (blocks 444 and 446), the central facility processor 224 determines that the viewing report is invalid (block 454). Control then proceeds to block 414 of FIG. 4A and continues as described above.

Figure 4D:
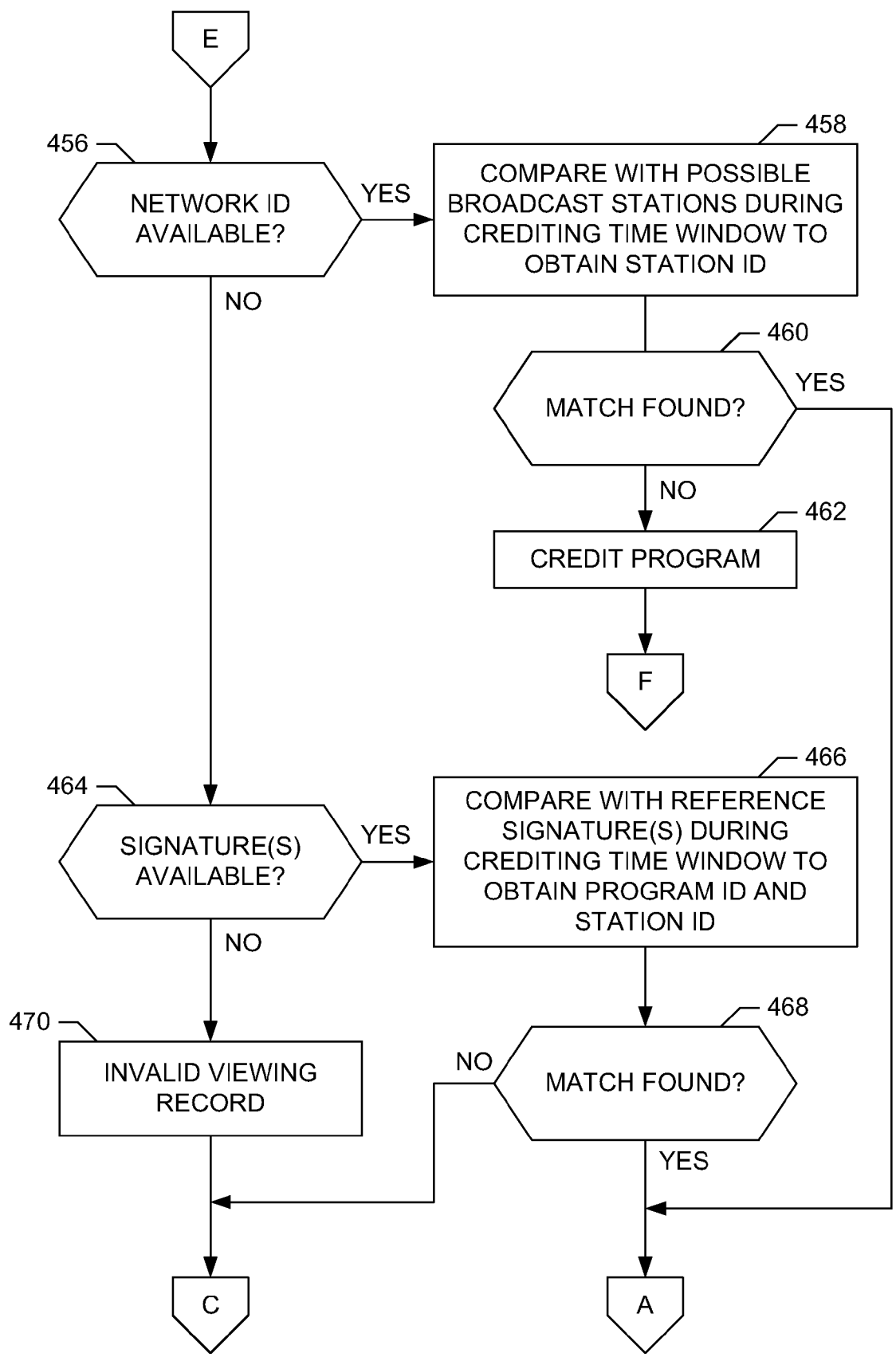

If a set of possible broadcast time intervals is not available (block 442 of FIG. 4C), control proceeds to block 456 of FIG. 4D at which the central facility processor 456 determines whether a broadcast network ID (e.g., based on a program content code) is included in the viewing record. If a broadcast network ID is available (block 456), control proceeds to block 458 at which the central facility processor 224 performs a search over all possible broadcast stations/channels that could be received by the home entertainment system 102 of FIG. 1. If the network ID in the viewing record matches a network ID corresponding to a program broadcast on one of the possible broadcast stations (block 460), the central facility processor 224 uses the matched reference network ID to determine the broadcast time, channel number/station ID and/or program ID corresponding to the displayed program content, and control then proceeds to block 420 of FIG. 4A and continues as described above. If a match is not found at block 460, the central facility processor is able to generate a ratings/metering report that contains at least the broadcast network ID information (block 462). Control then proceeds to block 422 of FIG. 4A and continues as described above.

If a broadcast network ID is not available (block 456 of FIG. 4D), control proceeds to block 464 at which the central facility processor 224 determines whether the viewing record contains one or more signatures corresponding to the displayed program content. If one or more signatures are available (block 464), control proceeds to block 466 at which the central facility processor performs a search over all reference signatures stored, for example, in the database 226 of FIG. 2. If a match is found at block 468, the central facility processor 224 uses the matched reference signature to determine the broadcast time, channel number/station ID and/or program ID corresponding to the displayed program content, and control then proceeds to block 420 of FIG. 4A and continues as described above. If a match is not found (block 468) or if program identification is not available in the viewing record (blocks 456 and 464), the central facility processor 224 determines that the viewing report is invalid (block 470). Control then proceeds to block 414 of FIG. 4A and continues as described above.

One having ordinary skill in the art will appreciate that the example program 400 may be modified to support the crediting of content via multiple methods for collecting viewing/metering information. The crediting of content via multiple methods may be used to validate the credited results and to break crediting "ties" for cases in which a particular method results in an ambiguity for one or more classifications of interest (e.g., possible broadcast station, possible broadcast time, etc.). In the case of the program 400, an example modification to support the crediting of content via multiple methods could be to have control flow from block 420 to block 426, rather than to block 422 as depicted in FIGS. 4A and 4B. Such a modification would allow the program 400 to credit content via final distributor codes as well as via other collected information (such as program content codes and/or signatures). One having ordinary skill in the art will recognize that similar modifications may be made at various points in the example program 400 (e.g., corresponding to blocks 426, 428, 432, 436, 442, 444, 446 and/or 456) to facilitate the crediting of program content based on multiple viewing/metering collection methods.

As described above, the metering system described herein may be adapted to detect codes that were embedded at various points in the media distribution chain including codes that were embedded at the time-shifting device itself. When such codes are detected, they may be processed by the system for use in confirming that the related media content was viewed in a time-shifted manner and may further include additional information that may be useful in determining a variety of identification information about the media.

Figure 5:
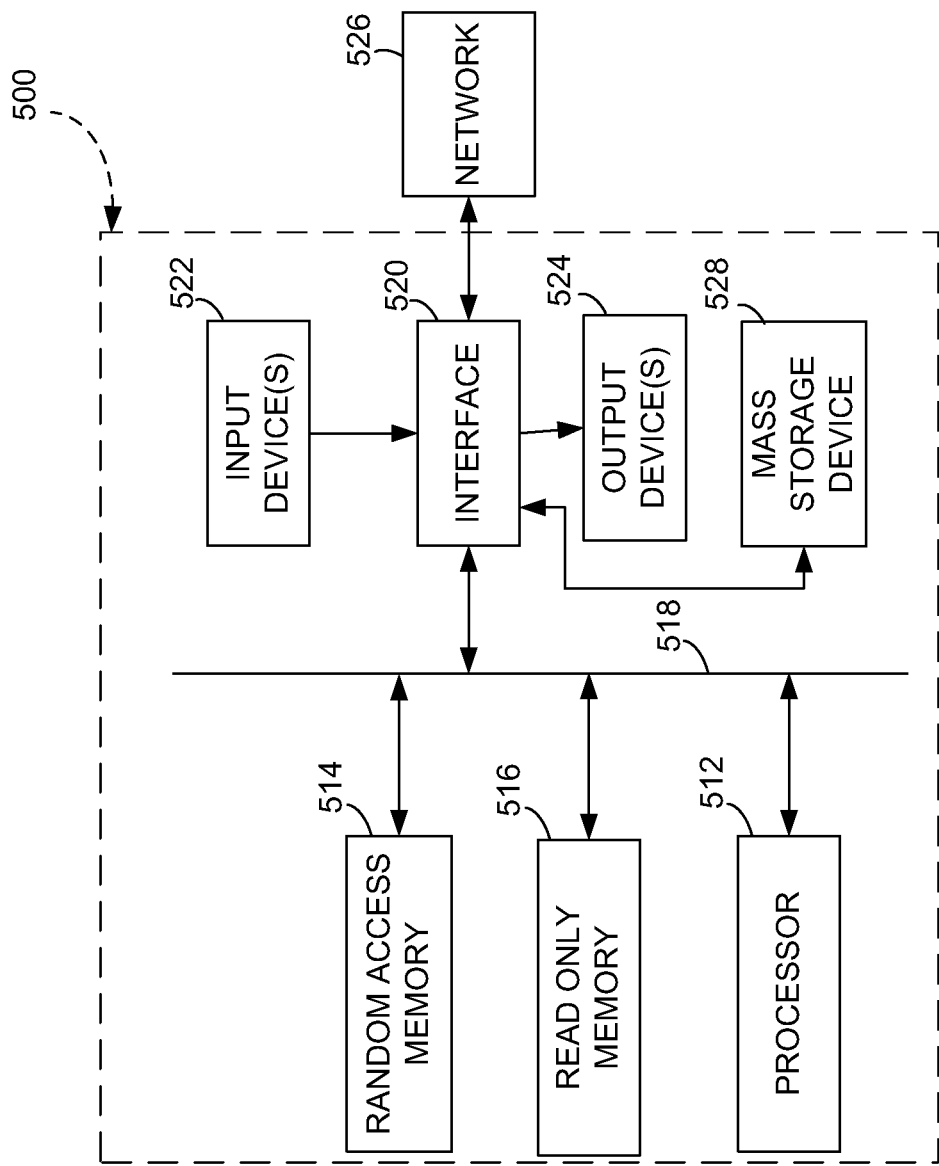
FIG. 5 is a block diagram of an example computer that may execute the programs of FIGS. 3A-3E and/or 4A-4D.

FIG. 5 is a block diagram of an example computer 500 capable of implementing the apparatus and methods disclosed herein. The computer 500 can be, for example, a server, a personal computer, a personal digital assistant (PDA), an Internet appliance, or any other type of computing device.

The system 500 of the instant example includes a processor 512. For example, the processor 512 can be implemented by one or more Intel® microprocessors from the Pentium® family, the Itanium® family or the XScale® family. Of course, other processors from other families are also appropriate. A processor such as processor 512 may be used to implement any or all of the time-shifting device monitor 128 and the home unit 124 (or portions thereof) of FIG. 1 and/or the central facility processor 224 (or portions thereof) of FIG. 2.

The processor 512 is in communication with a main memory including a volatile memory 514 and a non-volatile memory 516 via a bus 518. The volatile memory 514 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is typically controlled by a memory controller (not shown) in a conventional manner.

The computer 500 also includes a conventional interface circuit 520. The interface circuit 520 may be implemented by any type of well-known interface standard, such as an Ethernet interface, a universal serial bus (USB), and/or a third generation input/output (3GIO) interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, an isopoint and/or a voice recognition system.

One or more output devices 524 are also connected to the interface circuit 520. The output devices 524 can be implemented, for example, by display devices (e.g., a liquid crystal display, a cathode ray tube display (CRT)), by a printer and/or by speakers. The interface circuit 520, thus, typically includes a graphics driver card.

The interface circuit 520 also includes a communication device such as a modem or network interface card to facilitate exchange of data with external computers via a network 526 (e.g., an Ethernet connection, a digital subscriber line (DSL), a telephone line, coaxial cable, a cellular telephone system, etc.). The interface circuit 520 and the network 526 may implement the connection 140 of FIG. 1.

The computer 500 also includes one or more mass storage devices 528 for storing software and data. Examples of such mass storage devices 528 include floppy disk drives, hard drive disks, compact disk (CD) drives and DVD drives. The mass storage device 528 and/or the volatile memory 514 may be used to store the program information packets (or the contents thereof) in the time-shifting device monitor 128 of FIG. 1 and/or the viewing records in the home unit 124 of FIG. 1.

As an alternative to implementing the methods and/or apparatus described herein in a system such as the device of FIG. 5, the methods and or apparatus described herein may be embedded in a structure such as a processor and/or an ASIC (application specific integrated circuit).

From the foregoing, persons of ordinary skill in the art will appreciate that the example methods and apparatus described herein allow generation of ratings and/or metering information for time-shifted viewing of previously recorded media content.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    processing first bus information obtained by monitoring a bus of a time shifting device to determine a first time at which the time-shifting device stored data associated with first media being recorded for later presentation;
    processing second bus information obtained by monitoring the bus of the time shifting device to determine a second time, later than the first time, at which the time-shifting device later retrieved the stored data to present the recorded first media, the first time and the second time being determined from a first clock tracking local time for the time-shifting device;
    determining a third time at which the time-shifting device presented the recorded first media, the third time being determined from a second clock different from the first clock, the second clock tracking real time; and
    subtracting from the third time a difference between the second time and the first time to estimate a possible distribution time corresponding to when the first media was initially distributed to the time-shifting device.

2. A method as defined in claim 1 wherein the first bus information includes a memory address and a first indication that the data associated with the first media was written to the memory address, and processing the first bus information comprises:
    storing the memory address;
    determining the first time to be a time at which the data was stored at the memory address; and
    storing the first time in a memory.

3. A method as defined in claim 2 wherein the second bus information includes the memory address and a second indication that the data associated with the first media was read from the memory address, and processing the second bus information comprises:
    determining the second time to be a time at which the data was read from the memory address; and
    using the memory address to search the memory for the first time indicating the time at which the data was stored at the memory address.

4. A method as defined in claim 1 further comprising:
    using a first processing thread of a multi-threaded program to determine the difference between the second time and the first time; and
    using a second processing thread of the multi-threaded program, the second processing thread being different from the first processing thread, to subtract the difference between the second time and the first time from the third time ead.

5. A method as defined in claim 1 wherein the first media is streamed to the time-shifting device.

6. A method as defined in claim 5 further comprising:
    determining a plurality of record times corresponding respectively to when the time-shifting device stored a plurality of data packets associated with the first media;
    determining a plurality of playback times corresponding respectively to when the time-shifting device later retrieved the plurality of data packets to present the recorded first media; and
    estimating the possible distribution time based on differences between the plurality of playback times and the plurality of record times.

7. A tangible machine readable storage device or storage disk comprising machine readable instructions which, when executed, cause a machine to at least:
    process first bus information obtained by monitoring a bus of a time shifting device to determine a first time at which the time-shifting device stored data associated with first media being recorded for later presentation;
    process second bus information obtained by monitoring the bus of the time shifting device to determine a second time, later than the first time, at which the time-shifting device later retrieved the stored data to present the recorded first media, the first time and the second time being determined from a first clock tracking local time for the time-shifting device;
    determine a third time at which the time-shifting device presented the recorded first media, the third time being determined from a second clock different from the first clock, the second clock tracking real time; and subtract from the third time a difference between the second time and the first time to estimate a possible distribution time corresponding to when the first media was initially distributed to the time-shifting device.

8. A tangible storage device or storage disk as defined in claim 7 wherein the first bus information includes a memory address and a first indication that the data associated with the first media was written to the memory address, and the machine readable instructions, when executed, further cause the machine to:

store the memory address;

determine the first time to be a time at which the data was stored at the memory address; and store the first time in a memory.

9. A tangible storage device or storage disk as defined in claim 8 wherein the second bus information includes the memory address and a second indication that the data associated with the first media was read from the memory address, and the machine readable instructions, when executed, further cause the machine to:

determine the second time to be a time at which the data was read from the memory address; and use the memory address to search the memory for the first time indicating the time at which the data was stored at the memory address.

10. A tangible storage device or storage disk as defined in claim 7 wherein the machine readable instructions, when executed, further cause the machine to:

use a first processing thread of a multi-threaded program to determine the difference between the second time and the first time; and use a second processing thread of the multi-threaded program, the second processing thread being different from the first processing thread to subtract the difference between the second time and the first time from the third time.

11. A tangible storage device or storage disk as defined in claim 7 wherein the first media is streamed to the time-shifting device.

12. A tangible storage device or storage disk as defined in claim 11 wherein the machine readable instructions, when executed, further cause the machine to:

determine a plurality of record times corresponding respectively to when the time-shifting device stored a plurality of data packets associated with the first media;

determine a plurality of playback times corresponding respectively to when the time-shifting device later retrieved the plurality of data packets to present the recorded first media; and estimate the possible distribution time based on differences between the plurality of playback times and the plurality of record times.

13. An apparatus comprising:

a device monitor including a first clock to track local time for a time-shifting device, the device monitor to:

process first bus information obtained by monitoring a bus of the time shifting device to determine a first time at which the time-shifting device stored data associated with first media being recorded for later presentation, the first time being determined by the device monitor based on the first clock; and process second bus information obtained by monitoring the bus of the time shifting device to determine a second time, later than the first time, at which the time-shifting device later retrieved the stored data to present the recorded first media, the second time being determined by the device monitor based on the first clock; and a meter including a second clock different from the first clock, the second clock to track real time, the meter to:

determine a third time at which the time-shifting device presented the recorded first media, the third time being determined from the second clock; and subtract from the third time a difference between the second time and the first time to estimate a possible distribution time corresponding to when the first media was initially distributed to the time-shifting device.

14. An apparatus as defined in claim 13 wherein the first media is streamed to the time-shifting device.

15. An apparatus as defined in claim 14 wherein the device monitor is further to:

determine a plurality of record times corresponding respectively to when the time-shifting device stored a plurality of data packets associated with the first media; and determine a plurality of playback times corresponding respectively to when the time-shifting device later retrieved the plurality of data packets to present the recorded first media; and the meter is further to:

estimate the possible distribution time based on the current time and differences between the plurality of playback times and the plurality of record times.

16. An apparatus as defined in claim 13 wherein the first bus information includes a memory address and a first indication that the data associated with the first media was written to the memory address, and, to process the first bus information, the device monitor is to:

store the memory address; and determine the first time to be a time at which the data was stored at the memory address; and store the first time in a memory.

17. An apparatus as defined in claim 16 wherein the second bus information includes the memory address and a second indication that the data associated with the first media was read from the memory address, and to process the second bus information, the device monitor is to:

determine the second time to be a time at which the data was read from the memory address; and use the memory address to search the memory for the first time indicating the time at which the data was stored at the memory address.

* * * * *